(12) United States Patent
Whatmough et al.

(10) Patent No.: US 8,639,987 B2
(45) Date of Patent: Jan. 28, 2014

(54) DATA PROCESSING APPARATUS AND METHOD USING MONITORING CIRCUITRY TO CONTROL OPERATING PARAMETERS

(75) Inventors: Paul Nicholas Whatmough, Cambridge (GB); David Michael Bull, Cambridge (GB); Shidhartha Das, Norwich (GB)

(73) Assignee: ARM Limited, Cambridge (GB)

( * ) Notice: Subject to any disclaimer, the term of this patent is extended or adjusted under 35 U.S.C. 154(b) by 481 days.

(21) Appl. No.: 12/929,848

(22) Filed: Feb. 18, 2011

(65) Prior Publication Data

US 2012/0216067 A1    Aug. 23, 2012

(51) Int. Cl.
  *G06F 11/00* (2006.01)

(52) U.S. Cl.
  USPC .......................................... 714/47.1; 714/47.3

(58) Field of Classification Search
  USPC ....................... 714/47.1, 47.2, 47.3
  See application file for complete search history.

(56) References Cited

U.S. PATENT DOCUMENTS

| | | | |
|---|---|---|---|
| 6,665,823 B2 * | 12/2003 | Lee | 714/55 |
| 7,278,080 B2 | 10/2007 | Flautner et al. | |
| 8,010,935 B2 * | 8/2011 | Tetelbaum et al. | 716/138 |
| 2004/0225461 A1 * | 11/2004 | Floyd et al. | 702/85 |
| 2005/0246613 A1 | 11/2005 | Blaauw et al. | |
| 2008/0004831 A1 * | 1/2008 | Li | 702/119 |
| 2012/0079314 A1 * | 3/2012 | Kamath et al. | 714/6.1 |

OTHER PUBLICATIONS

Tschanz, James et al., "A 45nm Resilient and Adaptive Microprocessor Core for Dynamic Variation Tolerance", Low-Power Proceesors & Communication, ISSCC, Session 15, (2010), pp. 282-283 and 1 Continuations page.
Das, Shidhartha et al., "RazorII: In Situ Error Detection and Correction for PVT and SER Tolerance", IEEE Journal of Solid-State Circuits, vol. 44, No. 1, (Jan. 2009), pp. 32-48.

* cited by examiner

*Primary Examiner* — Joshua Lohn
(74) *Attorney, Agent, or Firm* — Nixon & Vanderhye P.C.

(57) ABSTRACT

A data processing apparatus and method are provided that use monitoring circuitry to control operating parameters of the data processing apparatus. The data processing apparatus has functional circuitry for performing data processing, the functional circuitry including error correction circuitry configured to detect errors in operation of the functional circuitry and to repair those errors in operation. Tuneable monitoring circuitry monitors a characteristic indicative of changes in signal propagation delay within the functional circuitry and produces a control signal dependent on the monitored characteristic. In a continuous tuning mode operation, the tuneable monitoring circuitry modifies the dependency between the monitored characteristic and the control signal in dependence upon certain characteristics of the errors detected by the error correction circuitry. An operating parameter controller is then arranged, in the continuous mode of operation, to control one or more performance controlling operating parameters of the data processing apparatus in dependence upon the control signal. This enables efficient and robust control of those operating parameters in response to changes in environmental conditions.

25 Claims, 15 Drawing Sheets

| VALUE OF FIRST CONTROL SIGNAL | VALUE OF SECOND CONTROL SIGNAL | ACTION BY OPERATING PARAMETER CONTROLLER |
|---|---|---|
| 0 | 1 | DO NOT CHANGE VOLTAGE OF FREQUENCY |
| 1 | 1 | INCREASE VOLTAGE AND/OR DECREASE FREQUENCY |
| 0 | 0 | DECREASE VOLTAGE AND/OR INCREASE FREQUENCY |
| 1 | 0 | ERROR CASE (RE-PERFORM INITIAL TUNING MODE) |

FIG. 9

DATA PROCESSING APPARATUS AND METHOD USING MONITORING CIRCUITRY TO CONTROL OPERATING PARAMETERS

BACKGROUND OF THE INVENTION

1. Field of the Invention

The present invention relates to a data processing apparatus and method using monitoring circuitry to control operating parameters of the data processing apparatus.

2. Description of the Prior Art

Within a data processing system, for example an integrated circuit, it is known to employ adaptive power management techniques in order to reduce the power dissipation within the system. In accordance with adaptive power management techniques, one or more operating parameters (for example voltage or frequency) of the data processing system are modified during operation to seek to reduce power dissipation. Adaptive power management is becoming ever more important as process geometries decrease, due to increase in leakage current consumed by components as they shrink in size.

Considering voltage supply as one example of an operating parameter, when a data processing system is designed, a nominal operating voltage can be associated with the design. During post-manufacturing tuning, that operating voltage may be modified slightly having regards to variations introduced at the time of manufacture. However, such voltage levels are always by their nature set conservatively, to ensure that the circuit will operate correctly under all expected operating conditions. However, running a system at a voltage higher than necessary has a significant impact on power consumption. Adaptive power management techniques hence aim to reduce the power consumption by allowing operating parameters such as system clock frequency and supply voltage to be dynamically adjusted to meet the application throughput requirements.

With the aim of allowing margins in the setting of operating parameters to be reduced, it is known to provide functional circuitry within a data processing apparatus with error correction circuitry that is able to detect errors in operation of the functional circuitry and repair those errors in operation. Such an error correction circuit can be embodied in a variety of ways, but in one embodiment may take the form of a single event upset (SEU) tolerant flip-flop such as discussed in commonly owned U.S. Pat. No. 7,278,080, the entire contents of which are hereby incorporated by reference, this patent describing a design technique sometimes referred to as "Razor". In accordance with the basic Razor technique, a delay-error tolerant flip-flop is used on critical paths to allow the supply voltage to be scaled to the point of first failure (PoFF) of a die for a given frequency. Thus, all margins due to process-voltage-temperature (PVT) variations are eliminated, resulting in significant energy savings. In addition, the supply voltage can be scaled even lower than the first failure point into the sub-critical region, deliberately tolerating a targeted error rate, thereby providing additional energy savings. A further paper that describes the Razor technique is "Razor II: In-Situ Error Detection and Correction for PVT and SER Tolerance", IEEE Journal of Solid-State Circuits (JSSC), Volume 44, No. 1, January 2009.

Efficient and robust control of functional circuits, such as processors, that include in-situ error detection and correction mechanisms such as Razor is a non-trivial task. The conventional approach is to set the operating point (for example voltage and frequency of operation) in proportional response to the observed Razor error rate. However, there are a number of scenarios where this control scheme might result in significantly sub-optimal performance. The main reason for this is that there may be a significant delay before a change in environmental conditions is reflected in the Razor error rate, due to path activation. In other words, for a Razor flip-flop to detect a timing violation on its associated critical path, it is necessary to first sensitise that critical path, which in turn depends on the nature of the program phase being executed. As a particular example, if a processor is currently running only low intensity tasks, it may be that changes in environmental conditions that would be problematic were the processor busy do not initially cause any timing violations due to critical paths not being sensitised. As a result, interactions of program phase limiting critical path sensitisation, and fast changes in environmental conditions (for example local heating, IR drop, etc), can lead to underestimation of the actual operating point.

Underestimation of the operating point can in due course give rise to performance issues, since if the program phase subsequently changes significantly, and accordingly critical path activation increases, there will then be a sharp increase in the Razor error rate, which results in no forward progress in the pipeline (due to the stall and flush mechanisms being used to replay and correct the Razor errors), this situation persisting until the operating point is increased to an appropriate level, which can take hundreds of processor cycles for phase locked loop (PLL) lock time or off-chip voltage regulation to settle.

A known approach to measure fast changes in environmental conditions is a delay monitoring circuit, which involves sending alternate rising and falling clock edges along a calibrated delay line (made up for example of a chain of buffers or inverters) and then checking that the captured logic value is as expected.

The article "A 45 nm Resilient and Adaptive Microprocessor Core for Dynamic Variation Tolerance" by J Tschanz et al, 2010 IEEE International Solid-State Circuits Conference, pages 282-284, describes a technique for adaptive power management which incorporates a delay monitoring circuit (referred to in the article as a tuneable replica circuit (TRC)) in a system using Razor-style error correction circuits (referred to in the article as error-detection sequentials (EDS)). The TRCs described in the article consist of configurable inverter paths that are tuned at test time via scan to track critical path delays per pipeline stage of the processor. As a result, such TRCs can detect timing errors caused by environmental conditions even if the associated critical path in the processor is not sensitised at the time.

However, the approach described in the article requires calibration of the TRC (delay monitoring circuit) at test time over a variety of PVT conditions. In practice significant tester calibration time is too expensive for lower-margin ASIC products. Further, by calibrating the delay monitoring circuit at test time, this does not allow the delay monitoring circuit to take account of changes that occur over time through use of the processor, for example longer term effects such as wear-out (electromigration, Negative Bias Temperature Instability (NBTI), etc), and accordingly some margin would need to be included in order to allow for such long term effects.

It would be desirable to provide an improved technique for performing adaptive power management within a data processing apparatus employing in-situ error correction circuits.

SUMMARY OF THE INVENTION

Viewed from a first aspect, the present invention provides a data processing apparatus comprising: functional circuitry for performing data processing, the functional circuitry including error correction circuitry configured to detect errors in operation of the functional circuitry and to repair those errors in operation; an operating parameter controller configured to control one or more performance controlling operating parameters of said data processing apparatus; tuneable monitoring circuitry for monitoring a characteristic indicative of changes in signal propagation delay within the functional circuitry, and for producing a control signal dependent on said monitored characteristic; the tuneable monitoring circuitry, in a continuous tuning mode of operation, being configured to modify the dependency between the monitored characteristic and the control signal in dependence upon one or more characteristics of errors detected by said error correction circuitry; and the operating parameter controller being configured, in said continuous tuning mode of operation, to control said one or more performance controlling operating parameters in dependence upon said control signal.

In accordance with the present invention, one or more operating parameters of the data processing apparatus are controlled in dependence on a control signal produced by a tuneable monitoring circuit, the tuneable monitoring circuit monitoring a characteristic indicative of changes in signal propagation delay within the functional circuitry of the data processing apparatus. Further, the tuneable monitoring circuit receives information about errors detected by the error correction circuitry and uses this information to modify the dependency between the monitored characteristic and the control signal that it produces.

Through such an arrangement, the control of the operating parameters can be set based on the output of the delay monitoring circuit, with characteristics of errors detected by the error correction circuitry being used to tune the monitoring circuit.

Accordingly, such an approach allows the monitoring circuit to be tuned in use, thereby avoiding any significant tester calibration time. Further, since the monitoring circuitry is tuneable in use, it reduces the margin required to account for long term variation effects such as wear-out.

The tuneable monitoring circuitry can take a variety of forms, provided the circuitry is able to monitor a characteristic indicative of changes in signal propagation delay within the functional circuitry. Hence, the monitoring circuitry may for example monitor voltage changes or temperature changes within the data processing apparatus, or may directly seek to monitor signal propagation delay via inclusion of a signal transmission path within the monitoring circuitry itself. The exact location of the monitoring circuitry relative to the functional circuitry can also be varied provided that the characteristic being monitored by the monitoring circuitry is indicative of changes in the signal propagation delay within the functional circuitry. Hence, whilst in one embodiment the monitoring circuitry may be provided on the same chip as the functional circuitry, and indeed may be located physically close to the functional circuitry, in other embodiments the monitoring circuitry may be provided off-chip provided that the characteristic being monitored can be considered to be indicative of changes in signal propagation delay within the functional circuitry.

In one embodiment, the tuneable monitoring circuitry comprises a signal transmission path having a plurality of delay configurations, said monitored characteristic is delay of a signal transmitted over said signal transmission path, and said tuneable monitoring circuitry modifies the dependency between the monitored characteristic and the control signal by selecting between said plurality of delay configurations in dependence upon one or more characteristics of errors detected by said error correction circuitry.

The plurality of delay configurations can be implemented in a variety of ways. For example, in one embodiment, different impedances can be switched into particular paths in order to affect the speed of transmission of signals over those paths. However, in one embodiment, the tuneable monitoring circuitry comprises a plurality of delay elements which are selectively inserted into said signal transmission path to provide said plurality of delay configurations, such that said tuneable monitoring circuitry modifies the dependency between the monitored characteristic and the control signal by varying the length of the signal transmission path in dependence upon one or more characteristics of errors detected by said error correction circuitry.

In one such embodiment, the control signal is set to indicate that the signal has failed to propagate over said signal transmission path within a clock cycle of a clock controlling said tuneable monitoring circuitry, and the operating parameter controller is configured, in said continuous tuning mode of operation, to be responsive to said control signal being set to vary said one or more performance controlling operating parameters in order to seek to decrease the rate of errors observed by the error correction circuitry. Hence, in one such embodiment, the length of the signal transmission path can be varied having regard to certain characteristics of errors detected by the error correction circuitry, with the aim that the signal will typically succeed in propagating over the signal transmission path within the clock cycle, but such that an adverse change in environmental conditions would then cause that signal to fail to propagate. This can then enable a quick detection of such an adverse change in environmental conditions, causing the control signal to be set and the operating parameter controller to respond by modifying one or more operating parameters in order to seek to decrease the rate of errors observed by the error correction circuitry. This enables a quicker response to an adverse change in environmental conditions than would be possible if the operating parameter controller were instead responding directly to the error characteristics observed by the error correction circuitry, since it does not require the critical paths to be sensitised at the time the adverse change in operating conditions occurs.

In one embodiment, the operating parameter controller is configured, in said continuous tuning mode of operation, to be responsive to said control signal not being set for a predetermined period of time, to vary said one or more performance controlling operating parameters in order to seek to increase the rate of errors observed by the error correction circuitry. In such an embodiment, if the control signal has not been set for a predetermined period of time, this can indicate that there is more margin in the current set of operating parameters than is actually required, and that it may be appropriate to save some power consumption by modifying those operating parameters.

Whilst in one embodiment a single signal transmission path is provided, in an alternative embodiment the tuneable monitoring circuitry may comprise a further signal transmission path having a plurality of delay configurations provided by selective insertion of a plurality of delay elements into the further signal transmission path, with the delay elements used for said further signal transmission path differing from the delay elements used for said signal transmission path. The tuneable monitoring circuitry may then provide a control signal generator for generating the control signal dependent on whether the signal fails to propagate over said signal transmission path or over said further signal transmission path within a clock cycle of a clock controlling said tuneable monitoring circuitry.

Hence, in such embodiments, each signal transmission path uses a different kind of delay element, to monitor delay in respect of different features within the functional circuitry. The number of further signal transmission paths added is a matter of design choice. For example, in one embodiment, within one signal transmission path each delay element may form a wire-delay segment (indicative of metal interconnect delay), within another signal transmission path each delay element may be formed of a NAND gate arrangement, whilst within a yet further signal transmission path each delay element may be formed of a NOR gate arrangement.

Whilst in the above embodiments a single control signal is generated, in an alternative embodiment multiple control signals may be generated. In one such alternative embodiment, the tuneable monitoring circuit further comprises an additional signal transmission path having a plurality of delay configurations and produces an additional control signal dependent on delay of a signal transmitted over said additional signal transmission path, and said tuneable monitoring circuitry modifies the dependency between the monitored characteristic and the additional control signal by selecting between said plurality of delay configurations in dependence upon one or more characteristics of errors detected by said error correction circuitry. Hence, in such embodiments, the tuneable monitoring circuit produces two control signals, and the signal transmission path and additional signal transmission path can be configured in opposing manners, such that one path typically passes timing and the other path typically fails timing.

In particular, in one embodiment, the tuneable monitoring circuitry selects the delay configurations for the signal transmission path and the additional signal transmission path such that the signal typically succeeds in propagating over said signal transmission path within the clock cycle and the signal typically fails to propagate over said additional signal transmission path within the clock cycle. The additional control signal is cleared to indicate that the signal has succeeded in propagating over said additional signal transmission path within the clock cycle, and the operating parameter controller is configured, in said continuous tuning mode of operation, to be responsive to said additional control signal being cleared to vary said one or more performance controlling operating parameters in order to seek to increase the rate of errors observed by the error correction circuitry.

Hence, in such embodiments, rather than merely waiting for the control signal not to be set for a predetermined period of time before varying one or more operating parameters in order to seek to increase the rate of errors, the operating parameter controller can instead be arranged to make such an adjustment to the operating parameters if the additional control signal is cleared. This can enable further power savings to be achieved.

Whilst in the above described embodiments, the tuneable monitoring circuitry measures path delay over a configurable transmission path, as mentioned earlier the tuneable monitoring circuitry can take a variety of different forms. In an alternative embodiment, the tuneable monitoring circuitry comprises a temperature sensor, said monitored characteristic is temperature observed by the temperature sensor, and said tuneable monitoring circuitry modifies the dependency between the monitored characteristic and the control signal by varying how the value of the control signal varies with the observed temperature in dependence upon one or more characteristics of errors detected by said error correction circuitry.

In one particular embodiment, the temperature sensor produces an internal value dependent on the observed temperature, and the control signal is produced by adjusting the internal value by an offset value, the offset value being varied in dependence upon one or more characteristics of errors detected by said error correction circuitry.

Further, in another alternative embodiment, the tuneable monitoring circuitry comprises a voltage sensor, said monitored characteristic is voltage observed at least one node within the data processing apparatus, and said tuneable monitoring circuitry modifies the dependency between the monitored characteristic and the control signal by varying how the value of the control signal varies with the observed voltage in dependence upon one or more characteristics of errors detected by said error correction circuitry.

In one particular embodiment, the voltage sensor produces an internal value dependent on the observed voltage, and the control signal is produced by adjusting the internal value by an offset value, the offset value being varied in dependence upon one or more characteristics of errors detected by said error correction circuitry.

Hence, considering one particular example of such a temperature sensor or voltage sensor embodiment, the monitoring circuit may be arranged to output values within a particular range dependent on the monitored characteristic, with the offset value being used to in effect identify a zero value, i.e. what value of monitored characteristic will give rise to a zero value of control signal. In such an example, if the control signal then takes certain positive values, the operating parameter controller may be arranged to modify the operating parameters in one sense (for example in order to seek to decrease the rate of errors) whereas if the control signal takes certain negative values, the operating parameter controller may be arranged to vary the operating parameters in the other sense (for example to seek to increase the rate of errors). As a particular example, if an increase in voltage is observed by the voltage sensor embodiment, and the frequency has not changed, this implies that the error rate is likely to have dropped, and in return a control signal can be issued to the operating parameter controller to seek to increase the error rate (for example by increasing frequency and/or reducing voltage).

In one embodiment, the operating parameter controller is configured, in an initial tuning mode of operation, to control said one or more performance controlling operating parameters in dependence upon said one or more characteristics of errors detected by said error correction circuitry until a predetermined condition is observed. The tuneable monitoring circuitry is then configured, in response to said predetermined condition being observed, to set an initial dependency between the monitored characteristic and the control signal such that a value of the control signal produced for a current value of the monitored characteristic will cause the operating parameter controller to maintain current settings of the one or more performance controlling operating parameters, whereafter said continuous tuning mode of operation is entered.

Hence, in such embodiments, the operating parameter controller can initially operate based on feedback from the error correction circuitry until a predetermined condition is observed, and at that point an initial calibration of the tuneable monitoring circuitry can take place such that the value of the monitored characteristic at that time would give rise to a control signal that would cause the operating parameter controller to not modify the operating parameters. At this point, the continuous tuning mode can then be entered.

The predetermined condition awaited during the initial tuning mode of operation can take a variety of forms, but in one embodiment is a desired error characteristic in respect of the errors being observed by the error correction circuitry. In one particular embodiment, this desired error characteristic may be a desired non-zero error rate. In particular, by seeking to achieve a non-zero error rate, it can be ensured that all margins due to PVT variations are eliminated. However, the desired non-zero error rate will typically be a relatively small non-zero error rate, due to the performance penalty incurred in replaying and correcting errors when they occur.

In one embodiment, during the initial tune mode of operation, the operating parameter controller is configured to modify said one or more performance controlling operating parameters from a safe level towards a level where errors are observed by the error correction circuitry, until said desired error characteristic is observed.

Whilst in one embodiment, the initial tuning mode may be used once at start up, and thereafter the continuous tuning mode may be used, in alternative embodiments it may be appropriate on occurrence of certain conditions to return to the initial tuning mode. In particular, in one embodiment, if during said continuous mode of operation a trigger condition is observed, the data processing apparatus is placed back into said initial tuning mode of operation.

The trigger condition can take a variety of forms, but in one embodiment the trigger condition is observed if said one or more characteristics of errors detected by said error correction circuitry indicates a predetermined non-acceptable error characteristic. An example of a non-acceptable error characteristic may be a particularly high rate of errors being observed which is considered to be out of the normal bounds.

When entering the initial tuning mode of operation, the operating parameter controller will need to choose starting values for the one or more performance controlling operating parameters. This may be done having regard to some predetermined safe set of operating parameters, for example a nominal operating voltage specified at manufacture time. However, in an alternative embodiment, the apparatus further comprises history storage for maintaining a record of values of said one or more performance controlling operating parameters which gave rise to no errors being observed by the error correction circuitry. The operating parameter controller then references that record when determining starting values for the one or more performance controlling operating parameters when in the initial tuning mode of operation. Typically such history storage will be associated with the tuneable monitoring circuit, and in such embodiments information about the current contents of the record can be provided to the operating parameter controller when the trigger condition is observed and hence the continuous mode of operation is being exited.

The one or more characteristics of errors detected by the error correction circuitry that can be used by the tuneable monitoring circuitry to vary the dependency between the monitored characteristic and the control signal can take a variety of forms. However, in one embodiment said one or more characteristics of errors comprise at least one of: an error rate of said errors detected by said error correction circuitry; and a reduction in processing performance resulting from repair by said error correction circuitry of said errors detected by said error correction circuitry.

Similarly, the one or more performance controlling operating parameters that the operating parameter controller controls in dependence on the control signal issued by the tuneable monitoring circuit can take a variety of forms. In one embodiment, such performance controlling operating parameters include at least one of: an operating voltage; an operating frequency; a body bias voltage; and temperature.

Whilst in one embodiment a single tuneable monitoring circuit may be provided in association with the functional circuitry, in an alternative embodiment the tuneable monitoring circuitry comprises a plurality of separate tuneable monitoring circuit portions placed at different locations within said data processing apparatus, each tuneable monitoring circuit portion producing an internal control signal dependent on the monitored characteristic as observed by that tuneable monitoring circuit portion. A global control signal generator then generates said control signal from the internal control signals produced by the plurality of separate tuneable monitoring circuit portions.

In one such embodiment, the error correction circuitry comprises a plurality of error correction circuit portions, each tuneable monitoring circuit portion being associated with at least one error correction circuit portion. Each tuneable monitoring circuit portion, in said continuous tuning mode of operation, is configured to modify the dependency between the monitored characteristic and its internal control signal in dependence upon one or more characteristics of errors detected by said associated at least one error correction circuit portion.

Hence, in such embodiments, each tuneable monitoring circuit portion can be associated with a particular part of the functional circuitry and can be tuned having regard to error characteristics observed in the associated part of the functional circuitry. Hence, local error information is used to tune a local monitoring circuit portion. However, since the operating parameter controller will typically operate on a more global scale, the various internal control signals produced by the separate tuneable monitoring circuit portions will typically be used by a global control signal generator to generate a single global control signal used by the operating parameter controller.

Viewed from a second aspect, the present invention provides a method of operating a data processing apparatus having functional circuitry for performing data processing, the functional circuitry including error correction circuitry for detecting errors in operation of the functional circuitry and for repairing those errors in operation, the method comprising: monitoring a characteristic indicative of changes in signal propagation delay within the functional circuitry, and producing a control signal dependent on said monitored characteristic; in a continuous tuning mode of operation, modifying the dependency between the monitored characteristic and the control signal in dependence upon one or more characteristics of errors detected by said error correction circuitry; and in said continuous tuning mode of operation, controlling one or more performance controlling operating parameters of the data processing apparatus in dependence upon said control signal.

Viewed from a third aspect, the present invention provides a data processing apparatus comprising: functional circuit means for performing data processing, the functional circuit means including error correction means for detecting errors in operation of the functional circuit means and for repairing those errors in operation; operating parameter control means for controlling one or more performance controlling operating parameters of said data processing apparatus; tuneable monitoring means for monitoring a characteristic indicative of changes in signal propagation delay within the functional circuit means, and for producing a control signal dependent on said monitored characteristic; the tuneable monitoring means, in a continuous tuning mode of operation, for modifying the dependency between the monitored characteristic and the control signal in dependence upon one or more characteristics of errors detected by said error correction means; and the operating parameter control means, in said continuous tuning mode of operation, for controlling said one or more performance controlling operating parameters in dependence upon said control signal.

BRIEF DESCRIPTION OF THE DRAWINGS

The present invention will be described further, by way of example only, with reference to embodiments thereof as illustrated in the accompanying drawings, in which:

FIG. 9 is a table illustrating the actions taken by the operating parameter controller based on the values of the two control signals produced by the tuneable monitoring circuitry of FIG. 8 in accordance with one embodiment;

DESCRIPTION OF EMBODIMENTS

Figure 1:
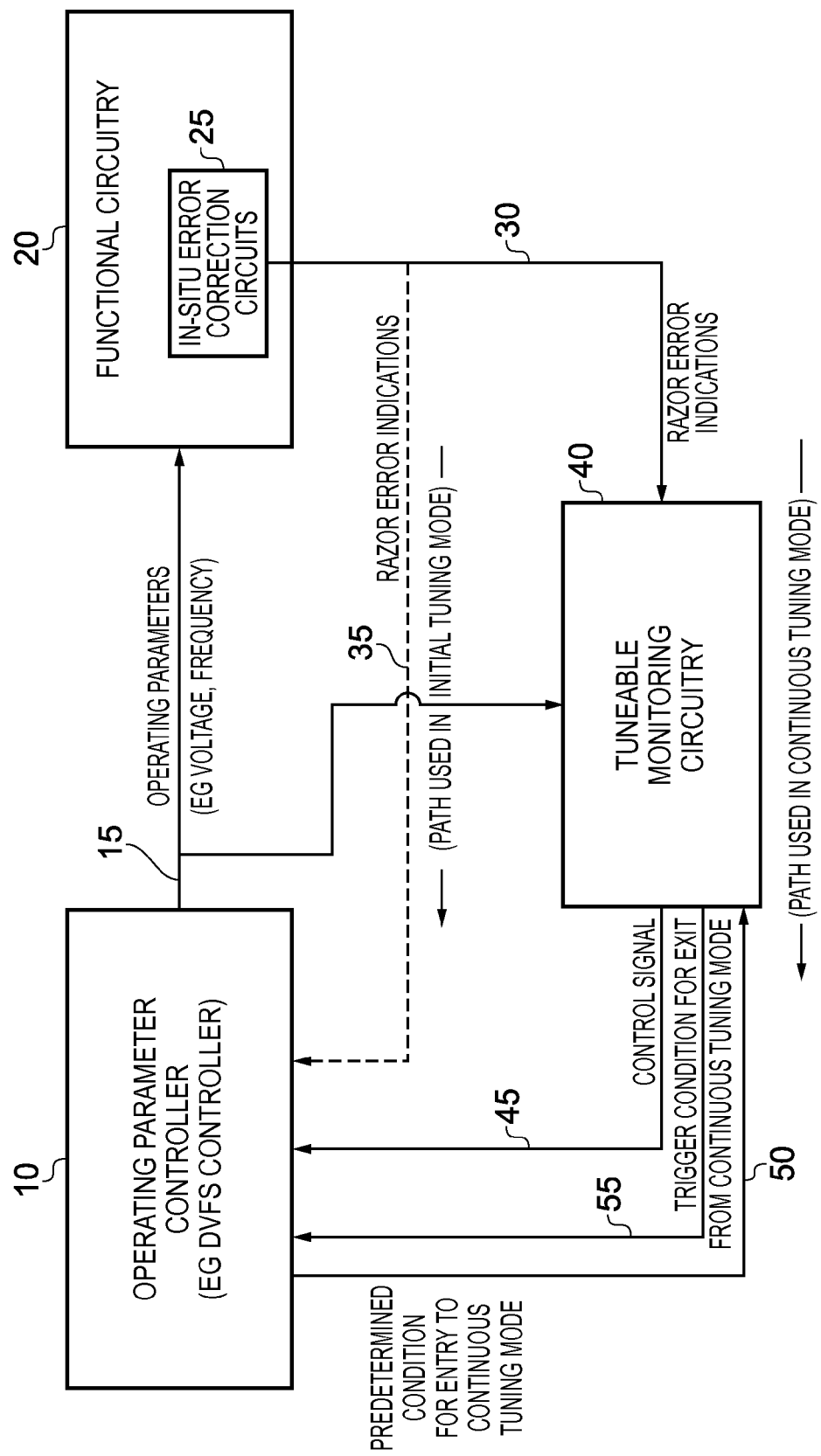
FIG. 1 is a block diagram of a data processing apparatus in accordance with one embodiment.

The data processing apparatus of FIG. 1 comprises functional circuitry 20 which has at least some of its operating parameters controlled by an operating parameter controller 10. In principle, the operating parameter controller may control any operating parameters that have an effect on performance of the functional circuitry such as operating voltage, operating frequency, a body bias voltage applied to certain components within the functional circuitry, or temperature (for example by selectively using fans to cool the functional circuitry). A common form of operating parameter controller is a dynamic voltage and frequency scaling (DVFS) controller which controls operating voltage and operating frequency with the aim of reducing energy consumption in a data processing system.

As shown in FIG. 1, the functional circuitry 20 includes in-situ error correction circuits 25 which are configured to detect errors in operation of the functional circuitry and to repair those errors. In particular, such in-situ error correction circuits are able to detect when a timing error is occurring on a critical path and are then able to correct that error, for example by replaying the affected operations.

In one embodiment, such in-situ error correction circuits 25 can be provided by delay-error tolerant flip-flops such as described in the earlier-mentioned commonly owned U.S. Pat. No. 7,278,080, the entire contents of which are hereby incorporated by reference. This patent describes a technique referred to as "Razor". In accordance with the Razor technique, errors are detected in the processing stages by comparison of a non-delayed data value with a delayed data value, these data values being captured at slightly different times. Commonly owned US published patent application no. 2005/0246613, the entire contents of which are hereby incorporated by reference, describes a transition detecting flip-flop that can be used to detect timing errors when employing Razor techniques. Timing errors occur in a Razor-like system when propagation delay through combinatorial logic causes the data input to an edge-triggered sequential element, such as a flip-flop, to violate set up requirements. Data may change state in the set up or the hold window causing metastability in the sequential element, or it may transition after the positive edge such that the sequential element captures incorrect state data. Razor error detection is provided augmenting each timing critical sequential element with a transition detector. The transition detector flags any transition on the data input of the sequential element in the set up timing window and during the positive phase of the clock.

Accordingly, it will be appreciated that by using Razor circuits within the functional circuitry 20, it is possible to reduce the voltage supply down (or increase the frequency up) to a level where certain critical paths start to fail their timing, whilst allowing the functional circuit to recover from such a situation through the error correcting functionality of the Razor circuits. There is clearly a performance impact in recovering from the error, and accordingly it is typically desirable to seek to achieve a desired error rate that is at a relatively low level. However, by maintaining a relatively low but non-zero error rate, it is possible to achieve an adjustment of the operating parameters (for example a reduction in voltage level) which enables significant energy savings to be realised.

As shown in FIG. 1, each time the in-situ error correction circuits 25 detect an error, they output an error indication over path 30 to tuneable monitoring circuitry 40, and also in one embodiment, during an initial tuning mode, output those Razor error indications over path 35 to the operating parameter controller 10 (as will be discussed in more detail later with reference to FIG. 4).

The tuneable monitoring circuitry can take a variety of forms, but is arranged to monitor a characteristic indicative of changes in signal propagation delay within the functional circuitry, and to produce a control signal dependent on that monitored characteristic. The tuneable monitoring circuitry 40 will typically have access to the output from the operating parameter controller, since this identifies at least some of the current operating parameters of the functional circuitry. As will be discussed in more detail later, the characteristic that the tuneable monitoring circuitry monitors can take a variety of forms, for example temperature observed by a temperature sensor within the tuneable monitoring circuitry, voltage observed at at least one node within the data processing apparatus, delay over a signal transmission path provided within the tuneable monitoring circuitry, etc.

The tuneable monitoring circuitry 40 produces a control signal dependent on the monitored characteristic, with that control signal being output over path 45 to the operating parameter controller 10, and with the operating parameter controller then controlling one or more operating parameters in dependence upon that control signal. Using the Razor error indications received over path 30, the tuneable monitoring circuitry 40 modifies the dependency between the monitored characteristic and the control signal in dependence upon one or more characteristics of the Razor errors as inferred from the Razor error indications. The one or more characteristics of the errors that are used to modify the dependency between the monitored characteristic and the control signal can take a variety of forms, but in one embodiment the Razor error indications are used to produce an error rate value for the errors detected by the in-situ error correction circuits, with the tuneable monitoring circuitry then varying the dependency between the monitored characteristic and the control signal dependent on the variations in that error rate. As another example, the tuneable monitoring circuitry may receive further information with the Razor error indication signals, enabling determination of a reduction in processing performance resulting from repair by the error correction circuits of the errors detected by the error correction circuitry, and to vary the dependence between the monitored characteristic and the control signal dependent on that processing performance impact.

As shown schematically in FIG. 1, the use of the control signal from the tuneable monitoring circuitry 40 to control the operating parameter controller 10 occurs during a continuous tuning mode of operation. In this embodiment, it will be seen that the control of the operating parameter controller 10 is based on the control signal output by the tuneable monitoring circuitry 40, and the Razor error rate is used to tune the tuneable monitoring circuitry. This is beneficial, since the tuneable monitoring circuitry 40 will more reliably react to sudden changes in environmental conditions than will the variation in Razor error rate, since the variation in the Razor error rate is dependent on the relevant critical paths being sensitised, which in turn depends on the nature of the program phase being executed by the functional circuitry.

However, in one embodiment, prior to entering the continuous tuning mode of operation, an initial tuning mode is used whereby the Razor error indications are used directly by the operating parameter controller 10 to influence adjustment of the operating parameters until a predetermined condition is observed, for example a desired non-zero error rate is achieved. At this point, the operating parameter controller 10 will issue a control signal over path 50 to the tuneable monitoring circuitry 40 to cause the data processing apparatus to enter a continuous tuning mode, whereafter the operating parameter controller 10 makes changes to the operating parameters in dependence on the control signal output from the tuneable monitoring circuitry 40 over path 45.

In addition, in one embodiment, it is envisaged that situations may arise where one or more trigger conditions are observed by the tuneable monitoring circuitry 40 to cause a return to the initial tuning mode of operation. In particular, if a trigger condition is observed by the tuneable monitoring circuitry 40, a trigger signal is issued over path 55 to the operating parameter controller 10 to cause the data processing apparatus to return to the initial tuning mode of operation. This may be appropriate for example, if significant changes in the characteristics of the errors detected by the in-situ error correction circuits 25 occur.

Figure 2:
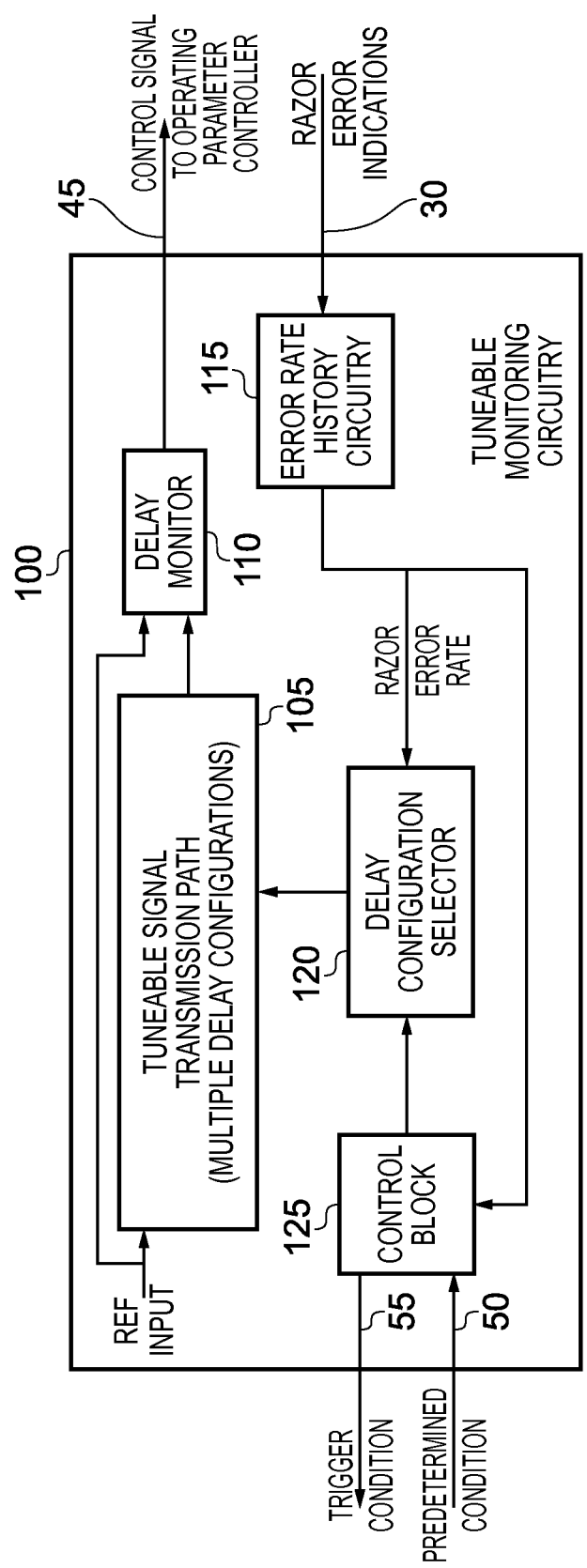
FIG. 2 illustrates in more detail the tuneable monitoring circuitry of FIG. 1 in accordance with one embodiment.

FIG. 2 is a block diagram illustrating in more detail the structure of the tuneable monitoring circuitry of FIG. 1 in accordance with one embodiment. In this embodiment, the tuneable monitoring circuitry 100 includes a tuneable signal transmission path 105 having multiple delay configurations, with individual delay configurations being selectable by the delay configuration selector 120. A reference input signal is input to the tuneable signal transmission path 105 and is also forwarded directly to a delay monitor 110, which receives as its other input the output from the tuneable signal transmission path. The delay monitor 110 determines whether the output from the tuneable signal transmission path is an expected value, given the value of the reference input, and produces a control signal output over path 45 dependent on that determination. Depending on the arrangement of the tuneable signal transmission path, the delay monitor 110 may expect its two inputs to match, or for one to be the inverse of the other. In one embodiment, if the signals are as expected, the control signal is cleared to a first logic value (for example a logic zero value) but if the delay monitor identifies that the output from the tuneable signal transmission path is not as expected, it sets the control signal to another logic value (for example a logic one value). In particular, it will be appreciated that if the value is not as expected, this will be due to the reference input signal not being able to traverse the entirety of the tuneable signal transmission path within a clock cycle.

In the embodiment illustrated in FIG. 2, the Razor error indications received over path 30 are input to error rate history circuitry 115. The error rate history circuitry 115 can be arranged in a variety of ways, but in one embodiment comprises a digital filter for applying a filtering operation to the error indications received over a period of time in order to generate an average error rate for that period of time. Accordingly, the error rate history circuitry 115 output a Razor error rate which is input to the delay configuration selector 120, and is also forwarded on to the control block 125. The control block 125 monitors the Razor error rate with the aim of detecting whether the Razor error rate represents a trigger condition, which would cause a trigger signal to be output over path 55 to the operating parameter controller 10 to cause the data processing apparatus to return to the initial tuning mode of operation. Similarly, the control block 125 is responsive to the signal over path 50 from the operating parameter controller 10 to determine whether the continuous tuning mode of operation should be entered, and accordingly the delay configuration selector 120 should be activated to select between the various delay configurations dependent on the received Razor error rate. It will be appreciated that in this example the monitored characteristic of the tuneable monitoring circuitry is the delay over the tuneable signal transmission path, and that by varying the delay dependent on the Razor error rate, this modifies the dependency between the monitored characteristic and the value of the control signal dependent on the Razor error rate.

Figure 3A:
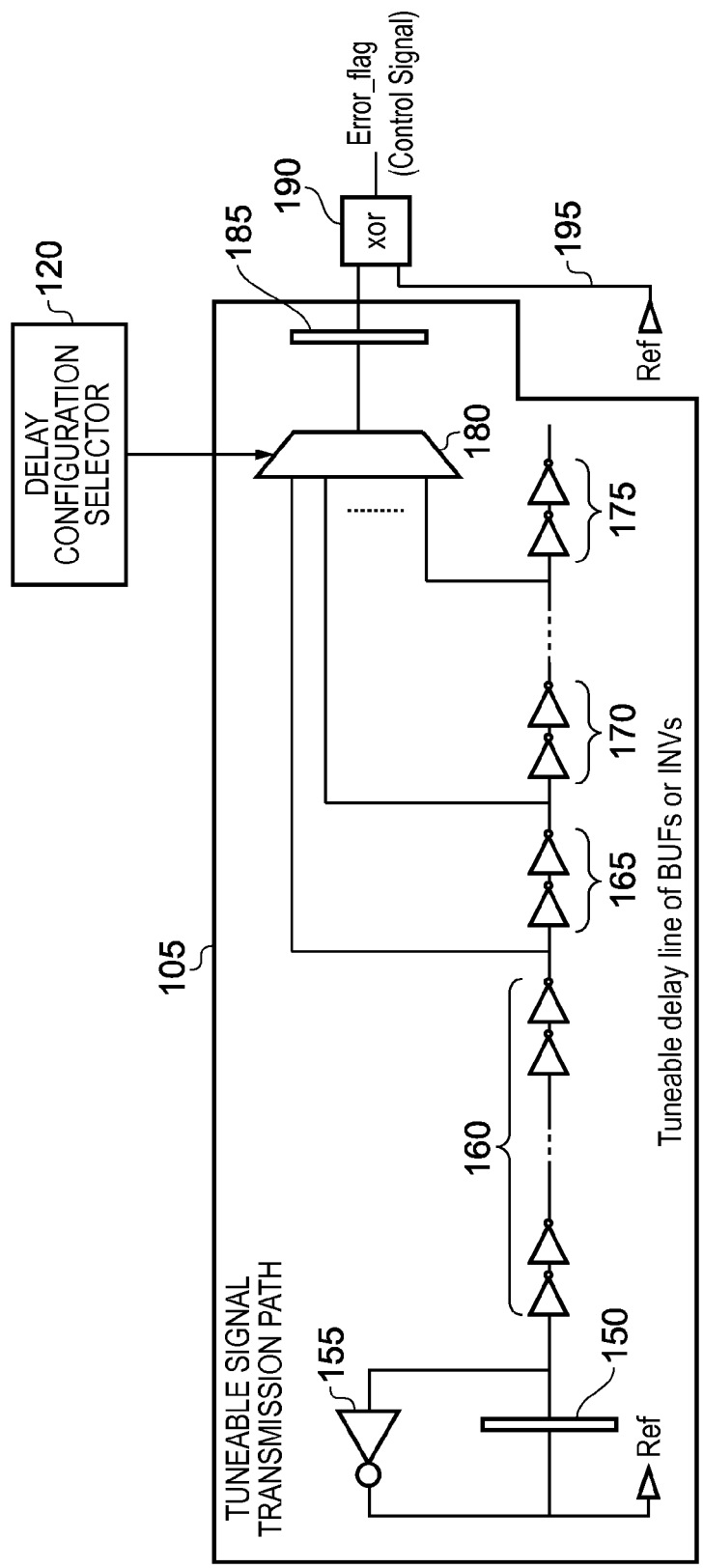
FIGS. 3A to 3C illustrate in more detail the tuneable signal transmission path of FIG. 2 in accordance with three example embodiments.
Figure 3B:
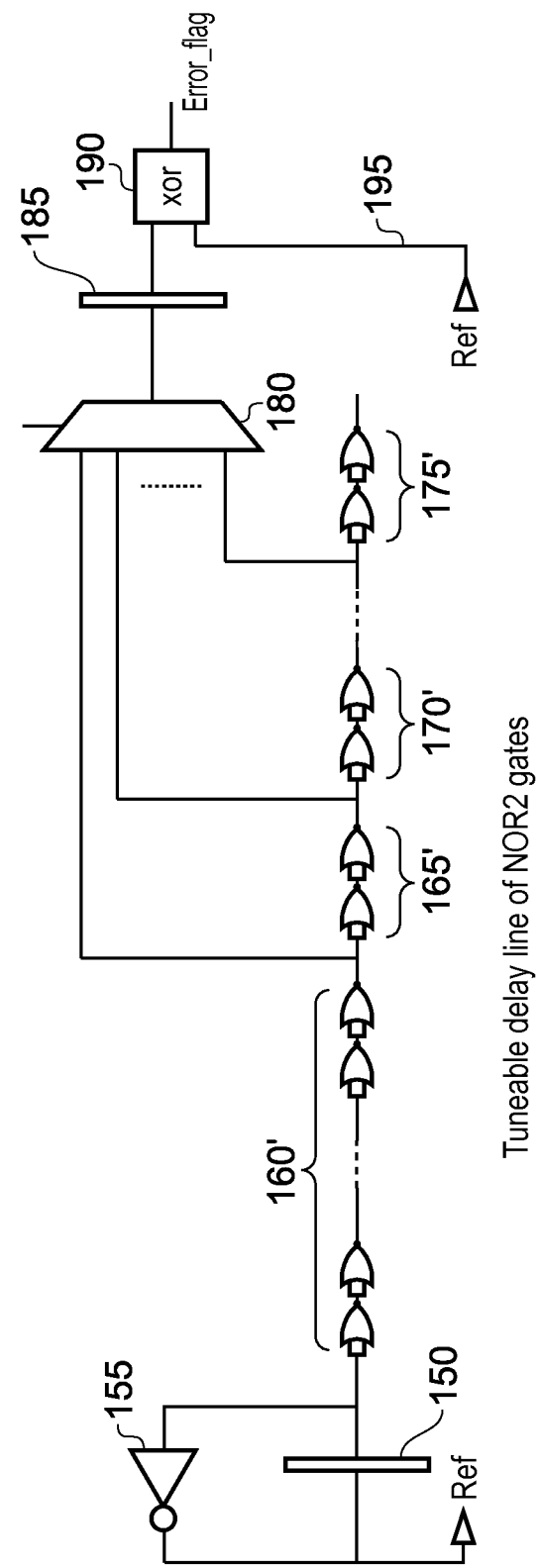
Figure 3C:
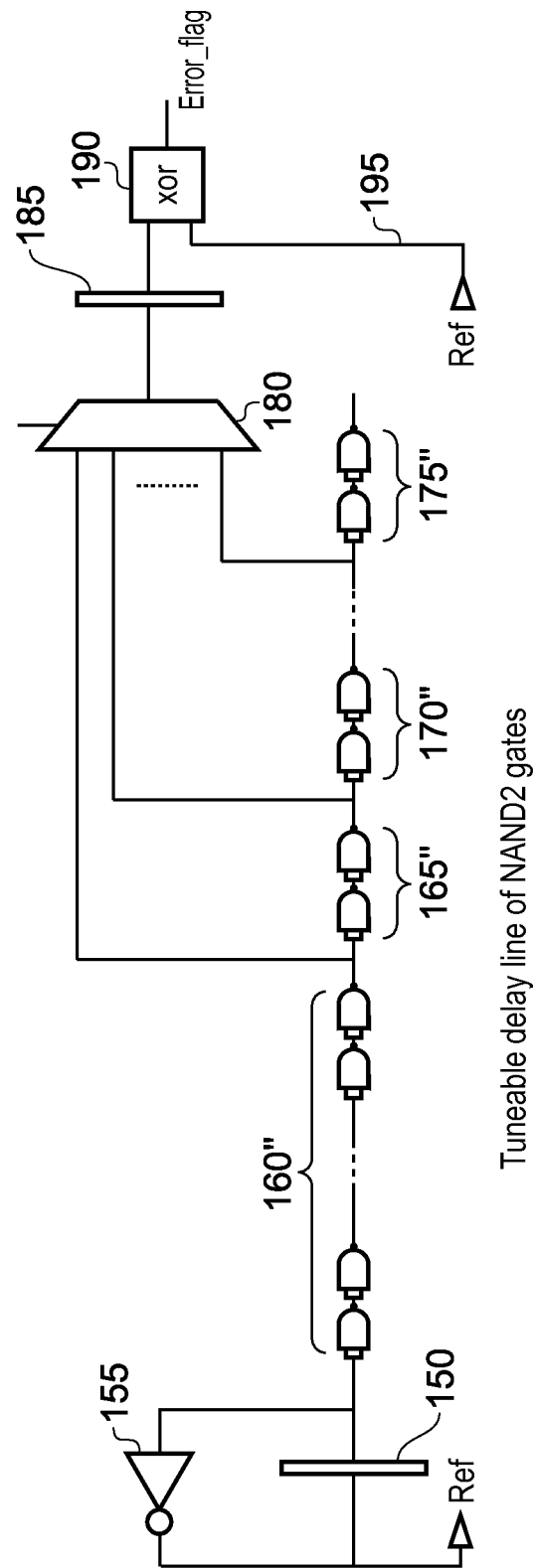

The tuneable signal transmission path 105 can be constructed in a variety of ways. For example, selectable capacitive loads may be connected to the path to affect transmission speed of signals over the path. However, in an alternative embodiment, as illustrated in the examples of FIGS. 3A to 3C, the tuneable signal transmission path comprises a series of delay elements, with the number of delay elements present in the tuneable signal transmission path being controlled by the delay configuration selector 120. In the example shown in FIG. 3A, the delay elements are buffers, where each buffer is formed by a pair of inverters. The minimum delay path is represented by the series of buffers 160 but the delay path can be lengthened by selectively introducing the additional buffers 165, 170, 175. In practice, all of the buffers are present within the path at all times, but the signal is tapped off at different points to provide multiple inputs to a multiplexer 180, with the multiplexer being controlled by the delay configuration selector 120 so as to forward into a latch 185 the signal as read from a particular point along the signal transmission path.

In the embodiment illustrated in FIG. 3A, the combination of the latch 150 and the inverter 155 are used to transmit alternate rising and falling edges down the signal transmission path, i.e. during one clock cycle, a logic one value will be output from the latch 150, during the next clock cycle a logic zero value will be output, during the next cycle a logic one value will be output, etc. This is beneficial, since logic zero values and logic one values may have differing transmission timing over a critical path, dependent on the components present in that critical path.

In the embodiment shown in FIG. 3A, the delay monitor 110 takes the form of an XOR gate 190 which compares the value stored in the latch 185 with the reference signal provided over path 195 (i.e. the output of the latch 150), thereby causing an error flag to be set to a logic one value whenever the two values differ, this error flag signal forming the control signal output over path 45 to the operating parameter controller 10.

FIG. 3B illustrates an alternative embodiment of the tuneable signal transmission path 105, where each delay element consists of a pair of NOR gates, each NOR gate having both inputs tied to the same signal. Hence, in this example the minimum delay path is represented by the series of NOR gate pairs 160' but the delay path can be lengthened by selectively introducing the additional NOR gate pairs 165', 170', 175'.

FIG. 3C illustrates a further alternative embodiment of the tuneable signal transmission path 105, where each delay element consists of a pair of NAND gates, each NAND gate having both inputs tied to the same signal. Hence, in this example the minimum delay path is represented by the series of NAND gate pairs 160" but the delay path can be lengthened by selectively introducing the additional NAND gate pairs 165", 170", 175".

Whilst in one embodiment a single signal transmission path is provided, in an alternative embodiment the tuneable monitoring circuitry may comprise multiple signal transmission paths, with the delay elements used for one signal transmission path differing from the delay elements used for another signal transmission path. The tuneable monitoring circuitry may then provide a control signal generator for generating the control signal dependent on whether the signal fails to propagate over any of the signal transmission paths within a clock cycle of a clock controlling said tuneable monitoring circuitry. In one example, such a control signal generator could implement a simple OR function to OR together the outputs from the XOR gates 190 associated with each separate signal transmission path.

Hence, in such embodiments, each signal transmission path could use a different kind of delay element, to monitor delay in respect of different features within the functional circuitry 20. For example, in one embodiment, one signal transmission path may be constructed as in FIG. 3A to form a wire-delay segment (indicative of metal interconnect delay), another signal transmission path may be constructed as in FIG. 3B, whilst a yet further signal transmission path may be constructed as in FIG. 3C. By using the FIG. 3B and 3C forms, the performance of different transistor stacks within the functional circuitry 20 could be monitored.

Figure 4:
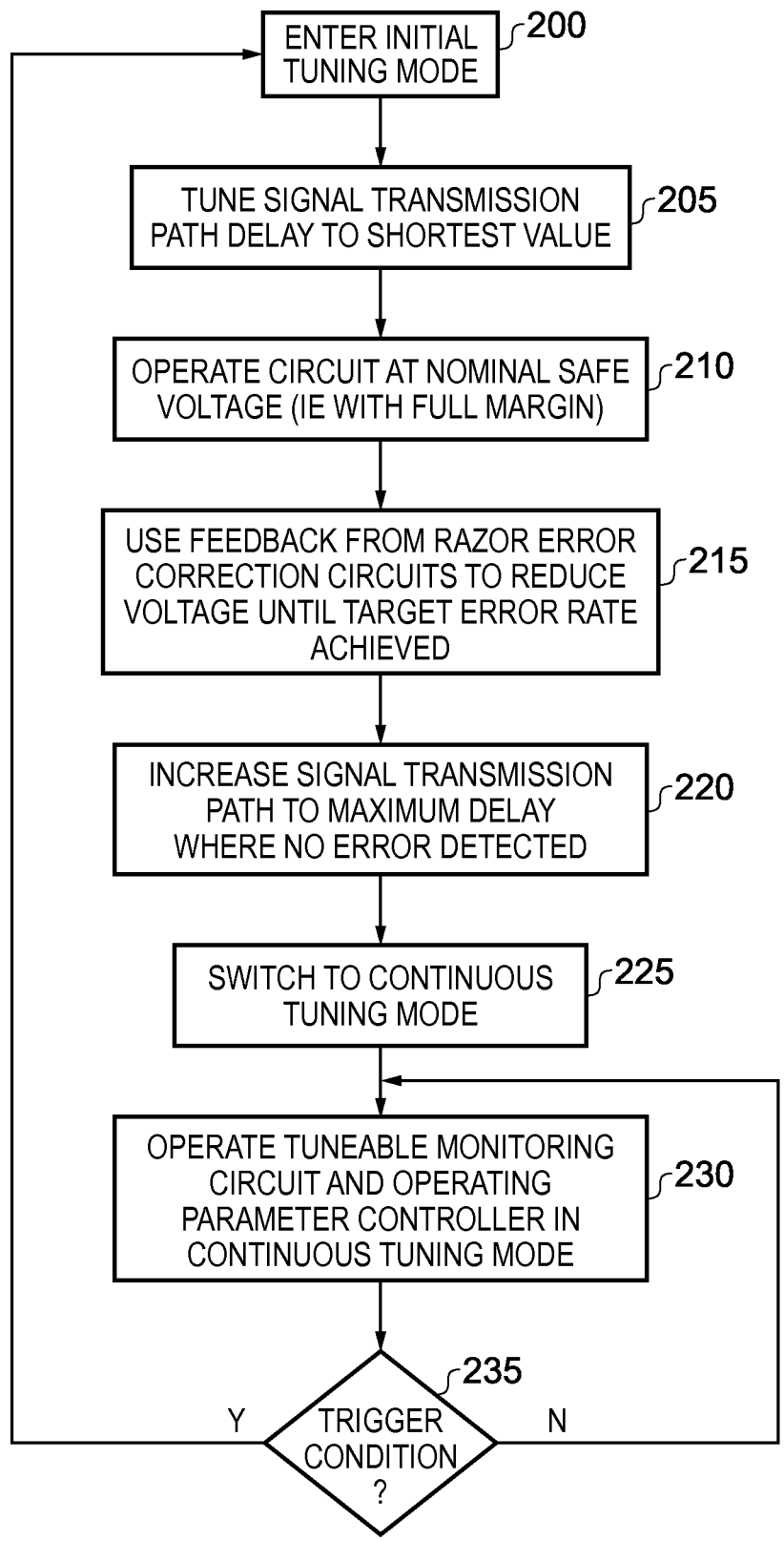
FIG. 4 is a flow diagram illustrating interaction between an initial tuning mode and a continuous tuning mode in accordance with one embodiment.

FIG. 4 is a flow diagram illustrating the operation of the data processing apparatus during the initial tuning mode, and the switching between the initial timing mode and the continuous tuning mode, for this discussion it being assumed that a single signal transmission path is provided within the tuneable monitoring circuitry. At step 200, the initial tuning mode is entered, whereafter at step 205 the signal transmission path 105 is tuned to the shortest delay value, i.e. that represented by the series of delay elements 160.

The functional circuitry is then operated at a nominal safe operating point known to the operating parameter controller 10 (step 210). In this example, it is assumed that the operating parameter controller is a DVS controller which is arranged to modify voltage, and accordingly the operating parameter controller would choose a nominal safe voltage which is known to be sufficient to ensure that all critical paths within the functional circuitry operate correctly across the full range of environmental conditions. As will be appreciated by those skilled in the art, such a nominal safe voltage may be set at the time of manufacture, and when this nominal safe voltage is used, the functional circuitry 20 is then operating with its full margin.

Whilst running at this nominal safe voltage, the feedback from the Razor error correction circuits 25 over path 35 is used to reduce the voltage until a predetermined condition is observed, which in this example is a target non-zero error rate being achieved (see step 215). Once the target non-zero error rate has been achieved at step 215, a signal is issued over path 50 to the tuneable monitoring circuitry 40 to cause it to calibrate the tuneable signal transmission path based on the current environmental conditions (step 220). Considering the example of FIG. 3, this will involve the delay configuration selector increasing the signal transmission path to a maximum delay length where no error is detected. In practice, it will be appreciated that there are a number of ways of doing this, but in one embodiment the delay path is incrementally adjusted until the XOR gate 190 detects an error, i.e. the path is just too long, and then the delay configuration selector steps back by one delay element to thereby identify the maximum length of signal transmission path which is still producing no errors.

Thereafter, the processor switches to the continuous tuning mode at step 225, and the tuneable monitoring circuit and operating parameter controller are then operated in the continuous tuning mode, as denoted schematically by the step 230 in FIG. 4. In the absence of a trigger condition being detected at step 235, the circuitry remains in the continuous tuning mode, but on occurrence of a trigger condition, the process returns to step 200 where the initial tuning mode is re-entered.

Figure 5:
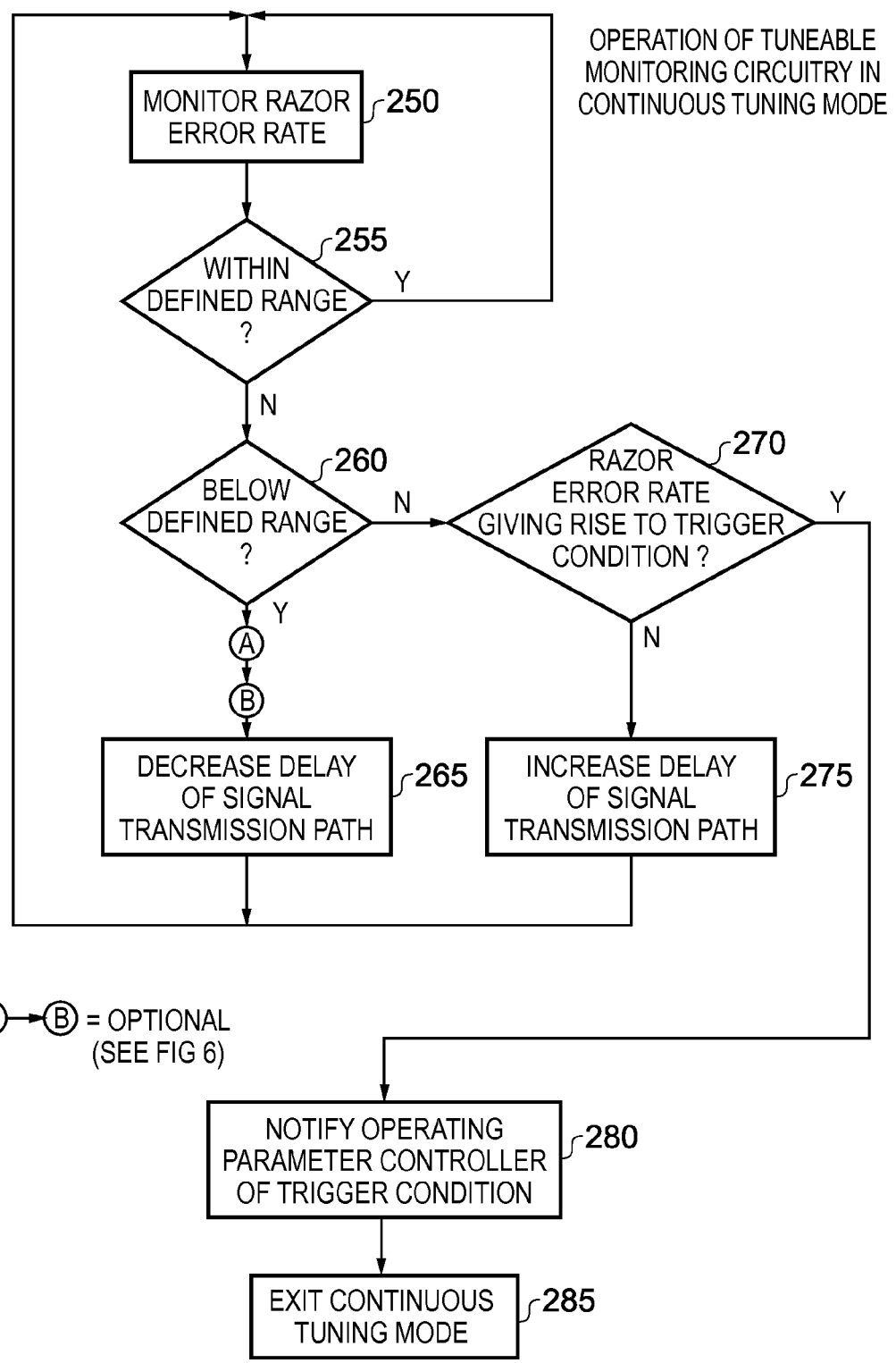
FIG. 5 illustrates the operation of the tuneable monitoring circuitry during the continuous tuning mode in accordance with one embodiment.

FIG. 5 is a flow diagram schematically illustrating the operation of the tuneable monitoring circuitry in a continuous tuning mode of operation, and hence provides in more detail a discussion of the operation of the tuneable monitoring circuitry at steps 230 and 235 of FIG. 4.

At step 250, the Razor error rate is monitored using the error rate history circuitry 115. At step 255, it is determined whether the current Razor error rate is within a defined range and, as long as it is, no action is taken to change the configuration of the tuneable signal transmission path. Accordingly, where the Razor error rate only varies by a relatively small amount, no change is made to the tuneable signal transmission path.

However, if it is determined that the Razor error rate is no longer within the defined range, then it is determined at step 260 whether it is below the defined range. If the Razor error rate is below the defined range, this indicates that the functional circuitry is operating with too much margin since the rate of errors being observed by the Razor error correction circuits is below the desired non-zero error rate. Accordingly, the process proceeds to step 265, where the delay of the signal transmission path is decreased. This will in turn mean that there is less likelihood of an error signal being generated by the delay monitor, and as will be discussed in more detail later with reference to FIG. 7, the absence of an error signal for a predetermined period of time can be used to cause the operating parameter controller to modify the operating parameters so as to seek to increase the Razor error rate.

If the monitored Razor error rate is not within the defined range, but is above the defined range, then the process proceeds to step 270 where it is determined whether the Razor error rate is at such a level that it is giving rise to a trigger condition. In particular, if there was a sudden rapid increase in the Razor error rate, it may be considered appropriate to issue a trigger condition to cause the continuous tuning mode to be exited. However, assuming the trigger condition is not detected, the process then proceeds to step 275 where the delay of the signal transmission path is increased. This will in turn increase the likelihood of errors being detected by the delay monitor, and as will be discussed later with reference to FIG. 7, when the control signal is set to indicate an error, the operating parameter controller can then be responsive to that condition to seek to vary the operating parameters so as to reduce the Razor error rate.

Following steps 265 or 275, the process then returns to step 250. However, if the trigger condition is detected at step 270, the process proceeds to step 280, where a trigger signal is issued over path 55 to the operating parameter controller 10, whereafter at step 285 the continuous tuning mode is exited.

Figure 6:
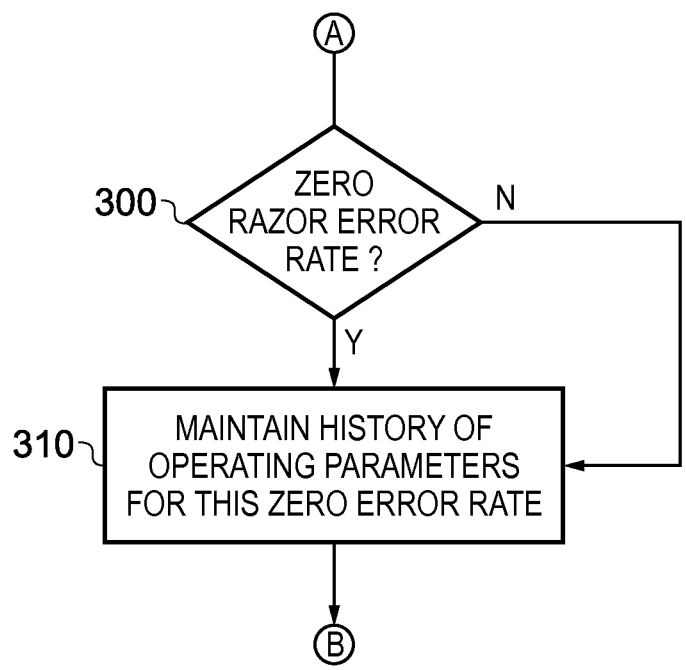
FIG. 6 is a flow diagram illustrating some additional optional steps that may be incorporated within the process of FIG. 5 in accordance with one embodiment.

As indicated in FIG. 5, an optional additional sequence of steps may be performed between the steps 260 and 265 of FIG. 5, as illustrated schematically in FIG. 6. In particular, in one embodiment, the tuneable monitoring circuitry may be arranged to identify when a zero Razor error rate is being detected (step 300) and whenever a zero Razor error rate is detected, it will then update a locally stored history of the operating parameters that are giving rise to this zero error rate (step 310). Details of this maintained history can then be provided to the operating parameter controller when exiting the continuous tuning mode, for example when notifying the operating parameter controller of the trigger condition at step 280. This history information then allows the operating parameter controller to set safe operating parameters at step 210 of FIG. 4 which may have less margin than the predefined safe operating point specified at the time of manufacture. This can reduce energy consumption, but also can increase the speed of operation of the initial tuning mode, since the functional circuit starts with a set of operating parameters closer to the point of first failure than would be the case if the operating parameters as specified at the time of manufacture were used.

Figure 7:
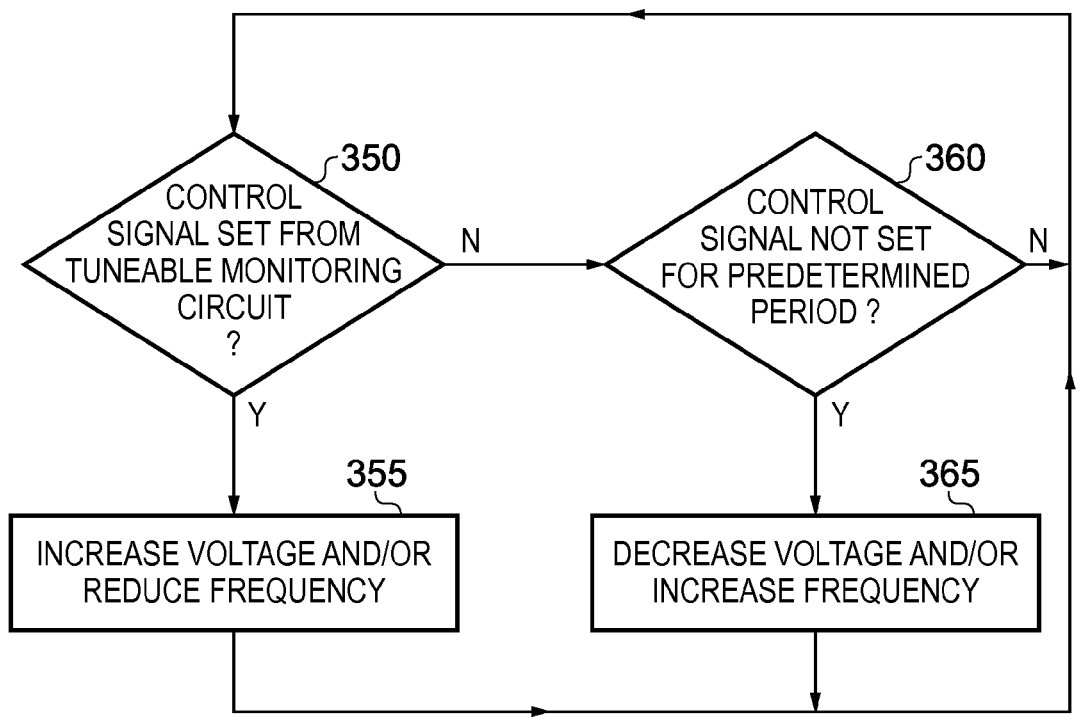
FIG. 7 is a flow diagram illustrating the operation of the operating parameter controller during the continuous tuning mode in accordance with one embodiment.

FIG. 7 is a flow diagram illustrating the operation of the operating parameter controller during the continuous tuning mode in accordance with one embodiment. At step 350, it is determined whether the control signal is set by the tuneable monitoring circuitry, and if so the process proceeds to step 355 where the operating parameter controller increases the voltage and/or reduces the frequency of operation of the functional circuitry 20. In this example, it is assumed that the operating parameter controller is a DVFS controller and accordingly can vary both voltage and frequency.

If the control signal is not set, then it is determined at step 360 whether the control signal has not been set for a predetermined period of time. If this is the case, then the operating parameter controller interprets this as an indication that the functional circuitry is operating with too much margin, and accordingly the process proceeds to step 365 where the operating voltage is decreased and/or the operating frequency is increased, thereby increasing the likelihood of Razor errors occurring. Following steps 355 or 365, the process then returns to step 350. Similarly, if it is determined that the control signal has only not been set for a relatively short period of time, i.e. a period less than the predetermined period, then the process again returns to step 350 without any adjustment being made to the operating parameters.

Considering steps 355 and 365, there are many ways in which a suitable size for the increase or decrease in operating parameters can be determined. For example, one approach from control theory would be to vary the operating parameter(s) as a proportion of the change in the control signal fed back from the tuneable monitoring circuit, which could for example be useful if the control signal were able to take on a range of values. In the example discussed earlier where the control signal takes the form of an error flag which is either set or clear, then the sizes of the adjustments may be predetermined, or may be varied dependent on the frequency of the set signal or the clear signal.

Figure 8:
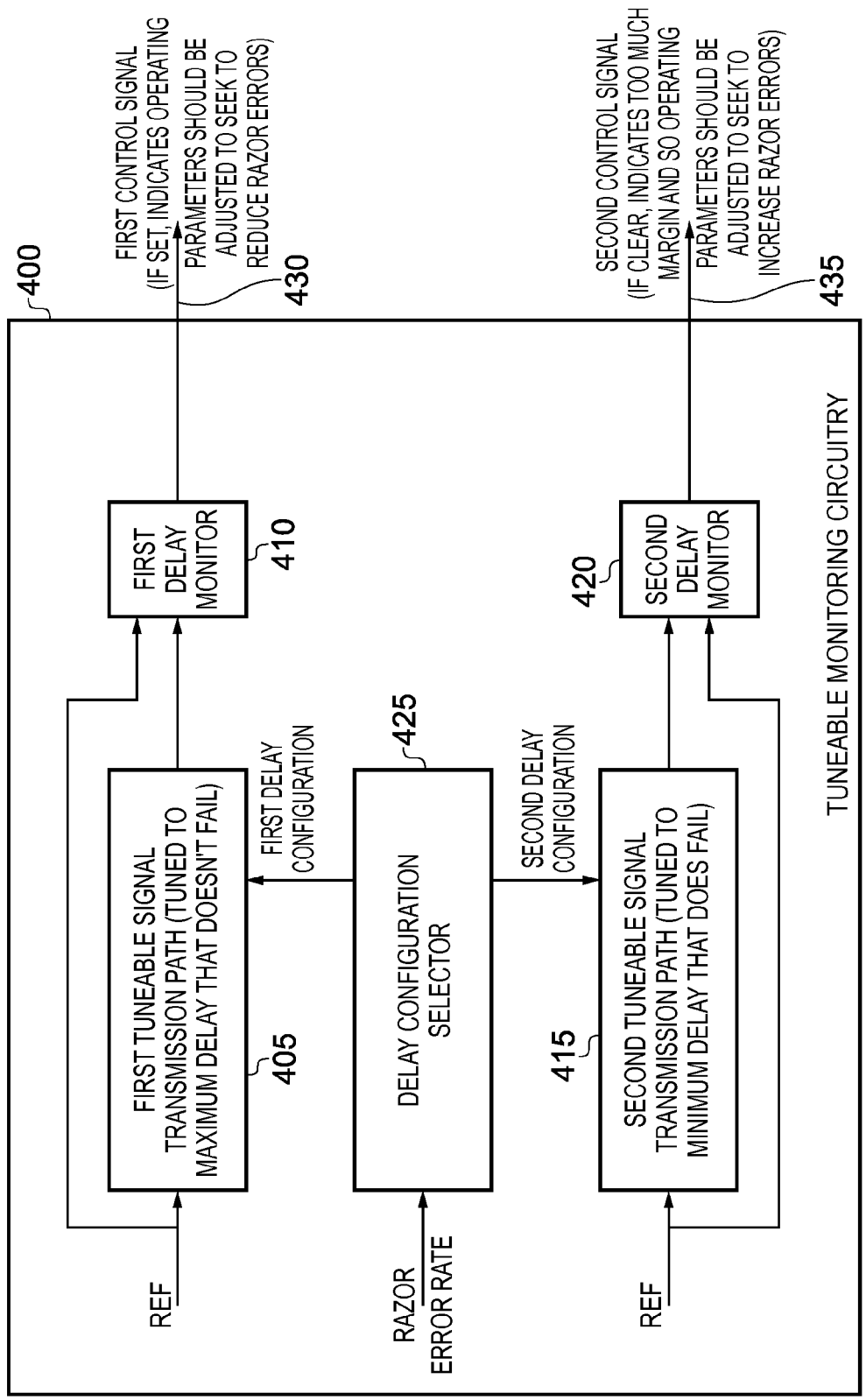
FIG. 8 illustrates schematically the structure of tuneable monitoring circuitry in accordance with an alternative embodiment.

FIG. 8 illustrates an alternative embodiment of tuneable monitoring circuitry, which, like FIG. 2, is based on monitoring path delay, but where two control signals are produced. In particular, the tuneable monitoring circuitry 400 of FIG. 8 includes two tuneable signal transmission paths 405, 415, along with associated delay monitors 410, 420, respectively. Both of the tuneable signal transmission paths are controlled by a delay configuration selector 425 which is responsive to Razor error rate, for example generated by the error rate history circuitry 115 discussed earlier in FIG. 2.

In the embodiment illustrated in FIG. 8, the first tuneable signal transmission path 405 is configured in the same way as the tuneable signal transmission path 105 of FIG. 2, and is hence tuned to the maximum delay path that does not fail. Accordingly, the first control signal output over path 430 is analogous to the control signal output over path 45 in FIG. 2, and accordingly when that control signal is set, this indicates that the operating parameter(s) should be adjusted to seek to reduce Razor errors.

In contrast, the second tuneable signal transmission path 415 is tuned to the minimum delay that does fail and accordingly it will be expected that the second control signal output over path 435 will generally be set. However, if that control signal is clear (e.g. a logic zero value) this can be used to indicate to the operating parameter controller 10 that there is too much margin, and so the operating parameters can be adjusted to seek to increase Razor errors. Through the combination of both signals, it is therefore possible to track the operating point very closely with changes in operating conditions.

Figure 10:
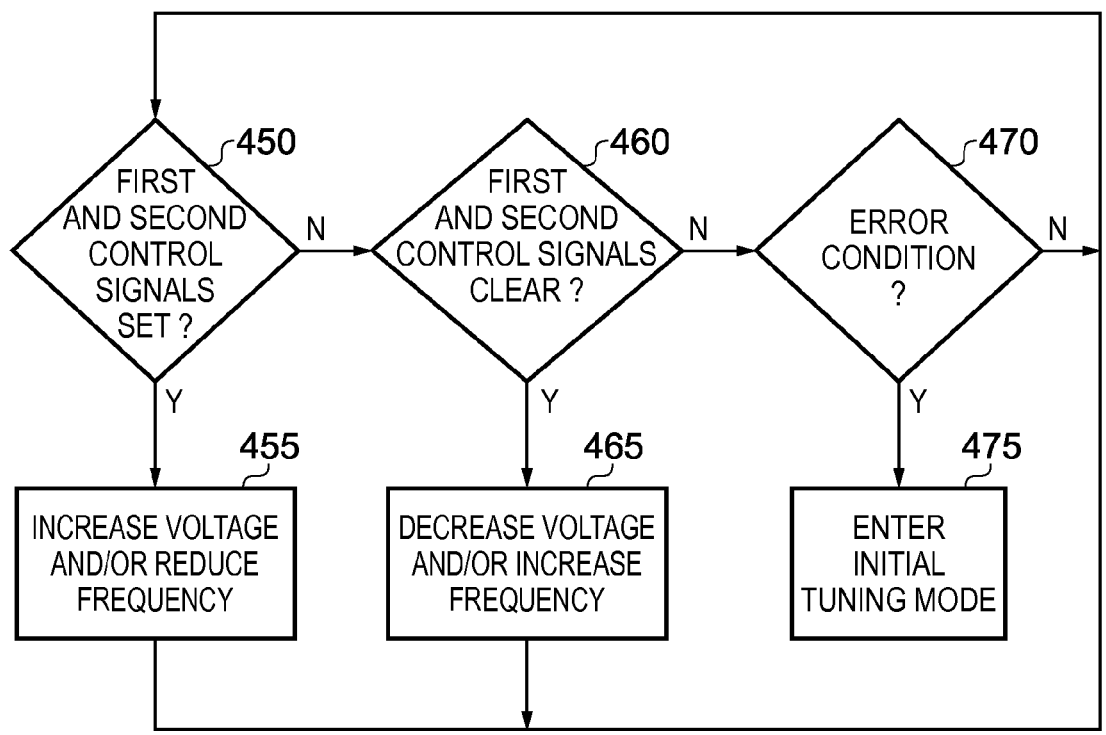
FIG. 10 is a flow diagram illustrating the operation of the operating parameter controller during the continuous tuning mode of operation when used in association with the tuneable monitoring circuitry of FIG. 8.

FIG. 9 is a table illustrating how the various values of the two control signals can be used by the operating parameter controller in one embodiment. FIG. 10 is a flow diagram illustrating the operation of the operating parameter controller in continuous tuning mode when using these two control signals. Accordingly, at step 450, it is determined whether the first and second control signals are set, and if they are, the process proceeds to step 455 where the voltage is increased and/or the operating frequency is reduced. If both the first and second control signals are not set, the process proceeds to step 460, where it is determined whether both the first and second control signals are clear. If this is the case, then the process proceeds to step 465, where the voltage is decreased and/or the operating frequency is increased.

If it is determined at step 460 that both the first and second control signals are not clear, then it is determined at step 470 whether there is an error condition. With reference to FIG. 9, this will occur if the value of the first control signal is one and the value of the second control signal is zero, this in principle being a case that should not arise. In one embodiment, if this error condition does arise, the process proceeds to step 475 where the initial tuning mode is entered. Assuming the error condition is not detected at step 470, then this means that the signals have the value shown in the first entry in the table of FIG. 9, and hence no change to the operating voltage or operating frequency is required.

Considering the operations performed in the initial tuning mode if the tuneable monitoring circuitry of FIG. 8 is used, then the processing still generally follows the flow illustrated in the flow diagram of FIG. 4. However, at step 205, in addition to tuning the first signal transmission path delay to the shortest value, in one embodiment the second signal transmission path delay will be tuned to the longest value. Similarly, at step 220, in addition to increasing the first signal transmission path to the maximum delay where no errors are detected, the second signal transmission path can be decreased to the minimum delay where an error is detected. In an alternative embodiment, no steps in association with the second signal transmission path may be taken until the first signal transmission path has had its delay increased to the maximum delay where no errors are detected at step 220. Then, a predetermined offset could be used to decide the tap position for the second signal transmission path, assuming both signal transmission paths take the form discussed earlier with reference to FIG. 3 and are constructed identically.

Whilst in one embodiment both of the signal transmission paths have the same structure, it will be appreciated that this is not a requirement and that they can be constructed differently if desired.

Considering the operation of the tuneable monitoring circuitry in the continuous mode of operation when that tuneable monitoring circuitry takes the form discussed earlier with reference to FIG. 8, it will again be appreciated that the general flow shown in the flow diagram of FIG. 5 is still appropriate. However, in one embodiment, steps 265 and 275 are modified slightly. In particular, at step 265, in addition to decreasing the delay of the first signal transmission path, the delay of the second signal transmission path will also be decreased similarly so as to maintain a fixed offset between the tap position of the first signal transmission path and the tap position of the second signal transmission path. Similarly, at step 275, in addition to increasing the delay of the first signal transmission path, the delay of the second signal transmission path can be increased by the same amount so as to maintain the fixed offset.

Figure 11:
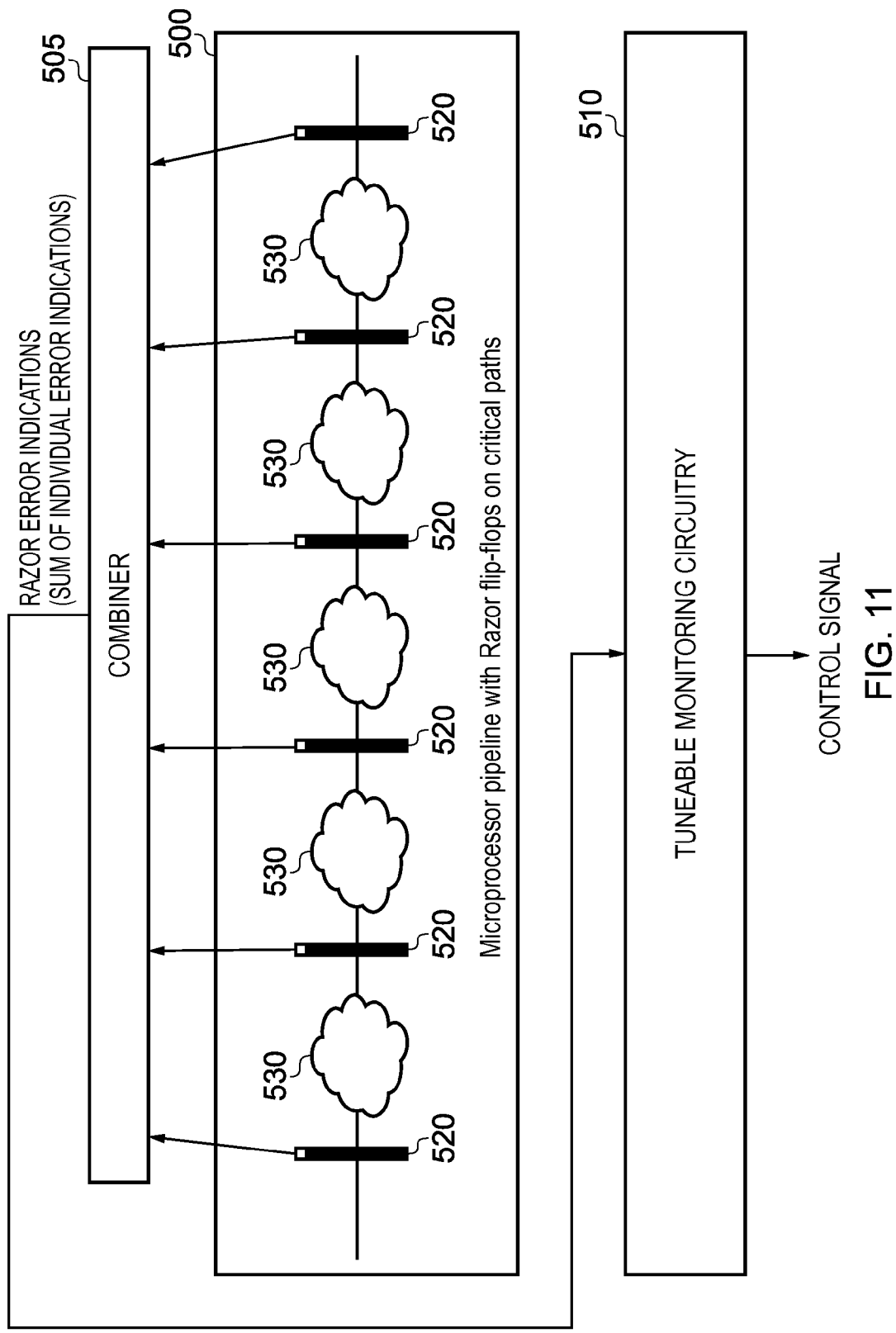
FIG. 11 illustrates one example of functional circuitry that may produce Razor error indications input to the tuneable monitoring circuitry.

The functional circuitry 20 can take a variety of forms. FIG. 11 illustrates one example where the functional circuitry takes the form of a microprocessor pipeline 500 with Razor flip-flops 520 placed on the critical paths. In this diagram, the elements 530 represent the functional logic within the critical paths between adjacent Razor flip-flops. The Razor error indications from the various Razor flip-flops 520 are received by a combiner circuit 505, which then outputs Razor error indications to the tuneable monitoring circuitry 510. In one embodiment, the Razor error indications are merely formed by summing the individual error indications from the individual Razor flip-flops.

Figure 12:
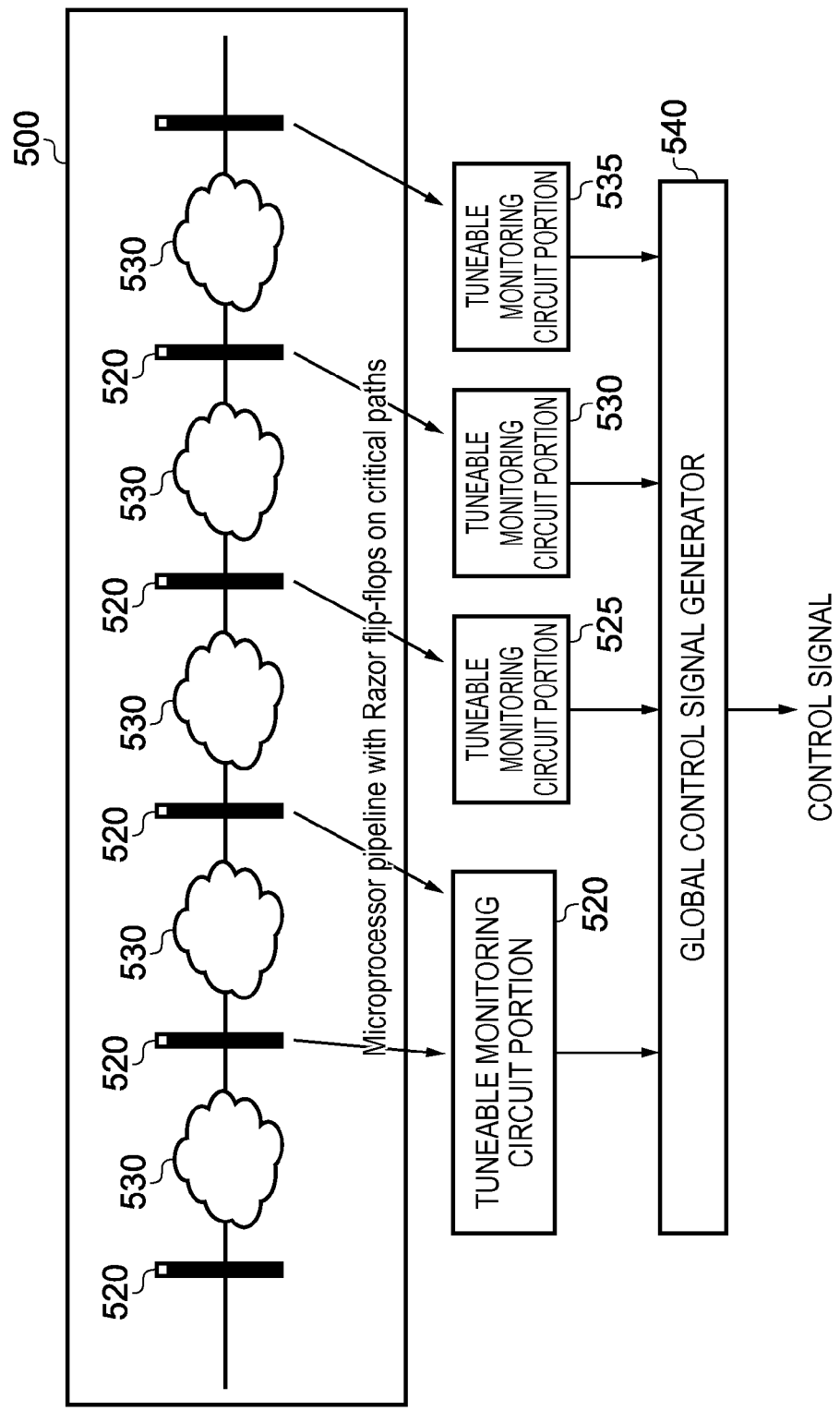
FIG. 12 illustrates an embodiment where multiple tuneable monitoring circuit portions are used in association with the functional circuitry.

FIG. 12 illustrates an alternative embodiment where, instead of having a single tuneable monitoring circuit 510, multiple separate tuneable monitoring circuit portions 520, 525, 530, 535 are provided. Having multiple separate monitoring circuit portions enables more accurate capture of variations in different locations on the data processing apparatus. This is useful because it gives information that is more localised, i.e. if one corner of a chip is hotter than the rest, then this area of the chip will limit performance. Accordingly, the various tuneable monitoring circuit portions are associated with different parts of the functional circuitry 20, and the associated local Razor error indications are then used to tune the individual tuneable monitoring circuit portions, as shown schematically in FIG. 12. Each individual tuneable monitoring circuit portion then produces an internal control signal dependent on the monitored characteristic as observed by that tuneable monitoring circuit portion, and a global control signal generator 540 is used to generate the control signal issued to the operating parameter controller 10 on the basis of those received internal control signals.

In one embodiment, the various internal control signals can be combined by a simple OR function in order to generate the control signal issued to the operating parameter controller, or in alternative embodiments it may be beneficial to combine the information in an alternative way to exploit knowledge of changes in environmental conditions across the chip, for example process variation gradients.

In a further alternative embodiment, the operating parameter controller may be split into a number of separate controllers for different regions of the data processing apparatus, e.g. to control different regions of an integrated circuit. One or more local tuneable monitoring circuit portions may then provide input to a local operating parameter controller. Hence, for example, when using such an embodiment, if one corner of the chip starts to heat up, the local clock frequency could be reduced, without affecting other parts of the integrated circuit.

Figure 13:
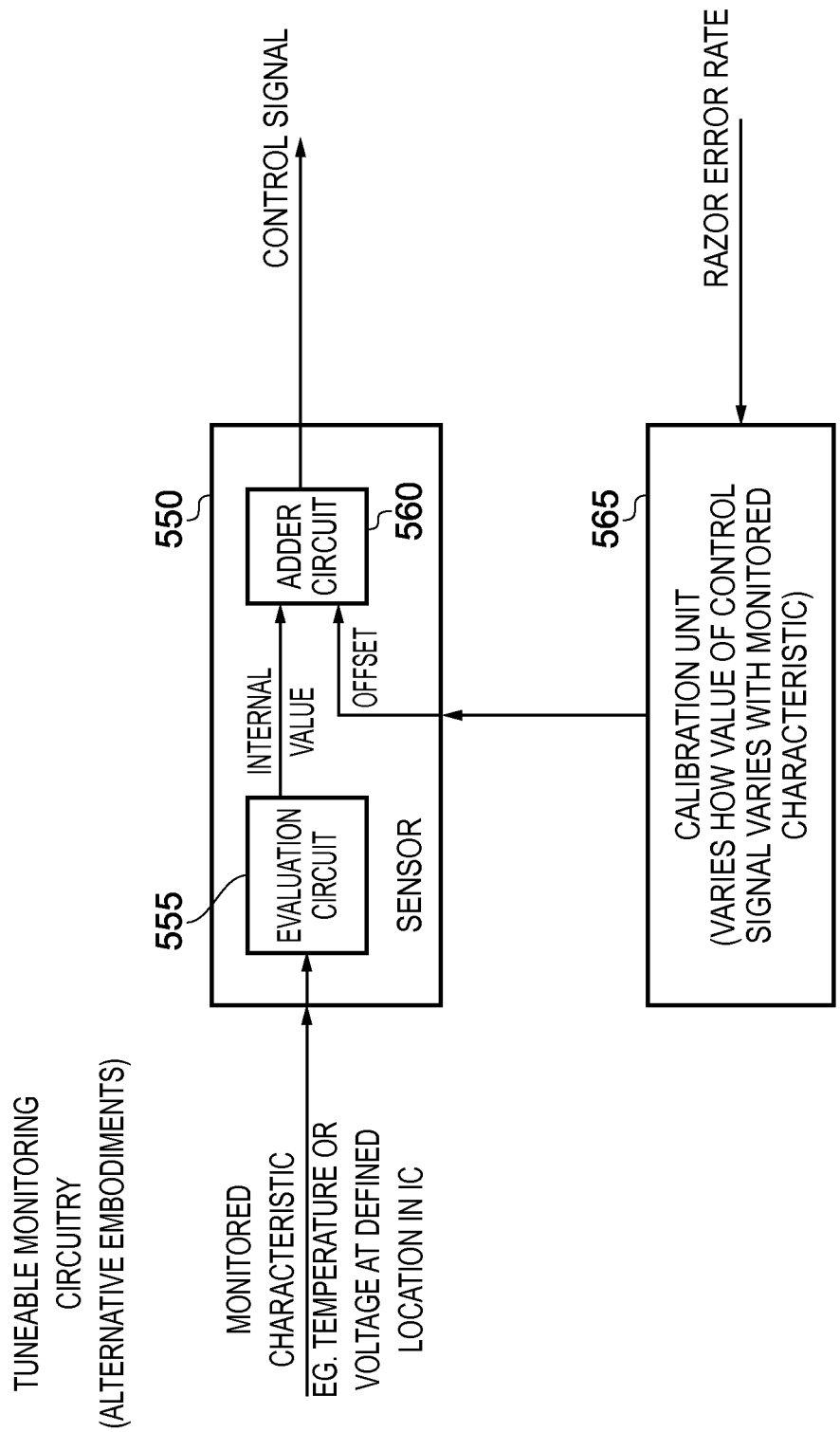
FIG. 13 is a block diagram schematically illustrating components provided within a tuneable monitoring circuit in accordance with an alternative embodiment.

In the above examples, a tuneable monitoring circuit in the form of a delay path monitor has been described. However, as discussed earlier with reference to FIG. 1, the tuneable monitoring circuitry 40 can actually take a variety of different forms, and hence for example may monitor temperate variation or voltage variation and produce control signals dependent thereon. FIG. 13 schematically illustrates components that may be provided within such a tuneable monitoring circuit. In particular, a sensor 550 can be provided having an evaluation circuit 555 which creates an internal value based on a monitored characteristic, for example temperature or voltage at a defined location within the integrated circuit. A calibration unit 565 is then able to output an offset value to the sensor Which varies with the received Razor error rate. This offset value is added to the internal value by adder circuit 560 in order to produce the control signal output to the operating parameter controller. Accordingly, it can be seen that the calibration unit varies how the value of the control signal varies with the monitored characteristic dependent on received Razor error rate. From a comparison with FIG. 2, it will be seen that the sensor 550 hence replaces the tuneable signal transmission path 105 and delay monitor 110, whilst the calibration unit 565 takes the place of the delay configuration selector 120.

The sensor 550 should be located such that the monitored characteristic varies sympathetically with the change in environmental conditions of the functional circuitry 20. Typically, this will mean that the sensor is placed on the same integrated circuit as the functional circuitry, ideally as close as possible. However, there could also be useful information available from a monitoring circuit not on the same integrated circuit in some embodiments, and accordingly the exact location of the sensor may be a matter of design choice.

Now consider as an example an embodiment where the sensor 550 is a temperature sensor which is able to produce an internal value in the range −100 to +100 that has an approximately linear positive response to global circuit temperature. After initial DVFS control using the Razor error rate during the initial tuning mode of operation has converged to an acceptable operating point giving the desired non-zero Razor error rate, the temperature sensor is then calibrated using the calibration unit 565. At this point, let us assume that the temperate sensor reads a value of +40, and hence in one embodiment the offset value of −40 is stored such that the output from the adder circuit 560 is recalibrated to a logic zero value.

After this calibration, the apparatus enters the continuous tuning mode of operation, and the temperature sensor output is used to control the DVFS controller with the Razor error rate being monitored as an indication of recalibration requirement. Purely by way of example, if the calibrated temperature sensor output increases (e.g. from zero to +8), this would indicate that the temperature has increased (which implies that the circuit will switch more quickly), and therefore the operating voltage can be decreased or the frequency increased. Similarly, if the temperature decreases, resulting in the temperature sensor output, for example, dropping to −12, then the circuit will switch more slowly, and so the frequency must be decreased and/or the voltage increased. In both of these examples, it is assumed that the Razor error rate is within a defined range, and accordingly with reference to FIG. 5 the calibration unit performs no recalibration (i.e. follows the yes path from step 255 of FIG. 5).

However, recalibration is necessary if the Razor error rate changes significantly. For example if the Razor error rate is too high (underestimating the critical temperature), then the offset value is reduced so that the control signal reduces to a lower value, thereby causing the voltage to be increased or the frequency reduced, thereby reducing the Razor error rate.

Similarly, if the Razor error rate is too low (overestimating the critical temperature), then the offset value needs to be increased so that the outputs from the control signal become more positive, thereby causing the voltage to be decreased and/or the frequency to be increased, thereby increasing the Razor error rate.

From the above discussion, if the flow of the initial tuning mode set out in FIG. 4 is reconsidered, it will be seen that if the sensor of FIG. 13 is used, there is no need for step 205, and at step 220, instead of adjusting a signal transmission path, the sensor is calibrated so as to produce a zero value output from the sensor in association with the current monitored characteristic.

From the above discussion, it will be appreciated that the described embodiments provide a reliable and robust mechanism for monitoring changes in global operating point (process, temperature, voltage, etc) of a data processing apparatus such as an integrated circuit, without requiring tester calibration. This in turn enables more efficient control of dynamic voltage and frequency scaling. The delay monitoring circuit used to control the operating parameter controller is calibrated using feedback from timing-error detection mechanisms. Accordingly, such an approach does not require expensive tester-calibration time, and allows the calibration to be achieved in-situ, which thereby reduces the margin required to account for long term variation effects.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
    functional circuitry for performing data processing, the functional circuitry including error correction circuitry configured to detect errors in operation of the functional circuitry and to repair those errors in operation;
    an operating parameter controller configured to control one or more performance controlling operating parameters of said data processing apparatus;
    tuneable monitoring circuitry for monitoring a characteristic indicative of changes in signal propagation delay within the functional circuitry, and for producing a control signal dependent on said monitored characteristic;
    the tuneable monitoring circuitry, in a continuous tuning mode of operation, being configured to modify the dependency between the monitored characteristic and the control signal in dependence upon one or more characteristics of errors detected by said error correction circuitry; and
    the operating parameter controller being configured, in said continuous tuning mode of operation, to control said one or more performance controlling operating parameters in dependence upon said control signal.

2. A data processing apparatus as claimed in claim 1, wherein:
    said tuneable monitoring circuitry comprises a signal transmission path having a plurality of delay configurations;
    said monitored characteristic is delay of a signal transmitted over said signal transmission path; and
    said tuneable monitoring circuitry modifies the dependency between the monitored characteristic and the control signal by selecting between said plurality of delay configurations in dependence upon one or more characteristics of errors detected by said error correction circuitry.

3. A data processing apparatus as claimed in claim 2, wherein said tuneable monitoring circuitry comprises a plurality of delay elements which are selectively inserted into said signal transmission path to provide said plurality of delay configurations, such that said tuneable monitoring circuitry modifies the dependency between the monitored characteristic and the control signal by varying the length of the signal transmission path in dependence upon one or more characteristics of errors detected by said error correction circuitry.

4. A data processing apparatus as claimed in claim 3, wherein:
    said tuneable monitoring circuitry comprises a further signal transmission path having a plurality of delay configurations provided by selective insertion of a plurality of delay elements into said further signal transmission path, the delay elements used for said further signal transmission path differing from the delay elements used for said signal transmission path; and
    said tuneable monitoring circuitry comprises a control signal generator for generating the control signal dependent on whether the signal fails to propagate over said signal transmission path or over said further signal transmission path within a clock cycle of a clock controlling said tuneable monitoring circuitry.

5. A data processing apparatus as claimed in claim 2, wherein:
    the control signal is set to indicate that the signal has failed to propagate over said signal transmission path within a clock cycle of a clock controlling said tuneable monitoring circuitry; and
    the operating parameter controller is configured, in said continuous tuning mode of operation, to be responsive to said control signal being set to vary said one or more performance controlling operating parameters in order to seek to decrease the rate of errors observed by the error correction circuitry.

6. A data processing apparatus as claimed in claim 5, wherein:
the operating parameter controller is configured, in said continuous tuning mode of operation, to be responsive to said control signal not being set for a predetermined period of time, to vary said one or more performance controlling operating parameters in order to seek to increase the rate of errors observed by the error correction circuitry.

7. A data processing apparatus as claimed in claim 5, wherein:
said tuneable monitoring circuitry further comprises an additional signal transmission path having a plurality of delay configurations and produces an additional control signal dependent on delay of a signal transmitted over said additional signal transmission path; and
said tuneable monitoring circuitry modifies the dependency between the monitored characteristic and the additional control signal by selecting between said plurality of delay configurations in dependence upon one or more characteristics of errors detected by said error correction circuitry.

8. A data processing apparatus as claimed in claim 7, wherein:
the tuneable monitoring circuitry selects the delay configurations for the signal transmission path and the additional signal transmission path such that the signal typically succeeds in propagating over said signal transmission path within the clock cycle and the signal typically fails to propagate over said additional signal transmission path within the clock cycle;
the additional control signal is cleared to indicate that the signal has succeeded in propagating over said additional signal transmission path within the clock cycle; and
the operating parameter controller is configured, in said continuous tuning mode of operation, to be responsive to said additional control signal being cleared to vary said one or more performance controlling operating parameters in order to seek to increase the rate of errors observed by the error correction circuitry.

9. A data processing apparatus as claimed in claim 1, wherein:
said tuneable monitoring circuitry comprises a temperature sensor;
said monitored characteristic is temperature observed by the temperature sensor; and
said tuneable monitoring circuitry modifies the dependency between the monitored characteristic and the control signal by varying how the value of the control signal varies with the observed temperature in dependence upon one or more characteristics of errors detected by said error correction circuitry.

10. A data processing apparatus as claimed in claim 9, wherein the temperature sensor produces an internal value dependent on the observed temperature, and the control signal is produced by adjusting the internal value by an offset value, the offset value being varied in dependence upon one or more characteristics of errors detected by said error correction circuitry.

11. A data processing apparatus as claimed in claim 1, wherein:
said tuneable monitoring circuitry comprises a voltage sensor;

said monitored characteristic is voltage observed at at least one node within the data processing apparatus; and
said tuneable monitoring circuitry modifies the dependency between the monitored characteristic and the control signal by varying how the value of the control signal varies with the observed voltage in dependence upon one or more characteristics of errors detected by said error correction circuitry.

12. A data processing apparatus as claimed in claim 11, wherein the voltage sensor produces an internal value dependent on the observed voltage, and the control signal is produced by adjusting the internal value by an offset value, the offset value being varied in dependence upon one or more characteristics of errors detected by said error correction circuitry.

13. A data processing apparatus as claimed in claim 1, wherein:
the operating parameter controller is configured, in an initial tuning mode of operation, to control said one or more performance controlling operating parameters in dependence upon said one or more characteristics of errors detected by said error correction circuitry until a predetermined condition is observed;
the tuneable monitoring circuitry is configured, in response to said predetermined condition being observed, to set an initial dependency between the monitored characteristic and the control signal such that a value of the control signal produced for a current value of the monitored characteristic will cause the operating parameter controller to maintain current settings of the one or more performance controlling operating parameters;
whereafter said continuous tuning mode of operation is entered.

14. A data processing apparatus as claimed in claim 13, wherein said predetermined condition is a desired error characteristic in respect of the errors being observed by the error correction circuitry.

15. A data processing apparatus as claimed in claim 14, wherein during said initial tuning mode of operation, the operating parameter controller is configured to modify said one or more performance controlling operating parameters from a safe level towards a level where errors are observed by the error correction circuitry, until said desired error characteristic is observed.

16. A data processing apparatus as claimed in claim 14, wherein said desired error characteristic is a desired non-zero error rate.

17. A data processing apparatus as claimed in claim 13, wherein if during said continuous mode of operation a trigger condition is observed, the data processing apparatus is placed back into said initial tuning mode of operation.

18. A data processing apparatus as claimed in claim 17, wherein said trigger condition is observed if said one or more characteristics of errors detected by said error correction circuitry indicates a predetermined non-acceptable error characteristic.

19. A data processing apparatus as claimed in claim 13, further comprising:
history storage for maintaining a record of values of said one or more performance controlling operating parameters which gave rise to no errors being observed by the error correction circuitry;
said operating parameter controller referencing said record when determining starting values for said one or more performance controlling operating parameters when in said initial tuning mode of operation.

20. A data processing apparatus as claimed in claim 1, wherein said one or more characteristics of errors comprise at least one of:
- an error rate of said errors detected by said error correction circuitry; and
- a reduction in processing performance resulting from repair by said error correction circuitry of said errors detected by said error correction circuitry.

21. A data processing apparatus as claimed in claim 1, wherein said one or more performance controlling operating parameters include at least one of:
- an operating voltage;
- an operating frequency;
- a body bias voltage; and
- temperature.

22. A data processing apparatus as claimed in claim 1, wherein said tuneable monitoring circuitry comprises:
- a plurality of separate tuneable monitoring circuit portions placed at different locations within said data processing apparatus, each tuneable monitoring circuit portion producing an internal control signal dependent on the monitored characteristic as observed by that tuneable monitoring circuit portion; and
- a global control signal generator for generating said control signal from the internal control signals produced by the plurality of separate tuneable monitoring circuit portions.

23. A data processing apparatus as claimed in claim 22, wherein:
- said error correction circuitry comprises a plurality of error correction circuit portions, each tuneable monitoring circuit portion being associated with at least one error correction circuit portion;
- each tuneable monitoring circuit portion, in said continuous tuning mode of operation, being configured to modify the dependency between the monitored characteristic and its internal control signal in dependence upon one or more characteristics of errors detected by said associated at least one error correction circuit portion.

24. A method of operating a data processing apparatus having functional circuitry for performing data processing, the functional circuitry including error correction circuitry for detecting errors in operation of the functional circuitry and for repairing those errors in operation, the method comprising:
- monitoring a characteristic indicative of changes in signal propagation delay within the functional circuitry, and producing a control signal dependent on said monitored characteristic;
- in a continuous tuning mode of operation, modifying the dependency between the monitored characteristic and the control signal in dependence upon one or more characteristics of errors detected by said error correction circuitry; and
- in said continuous tuning mode of operation, controlling one or more performance controlling operating parameters of the data processing apparatus in dependence upon said control signal.

25. A data processing apparatus comprising:
- functional circuit means for performing data processing, the functional circuit means including error correction means for detecting errors in operation of the functional circuit means and for repairing those errors in operation;
- operating parameter control means for controlling one or more performance controlling operating parameters of said data processing apparatus;
- tuneable monitoring means for monitoring a characteristic indicative of changes in signal propagation delay within the functional circuit means, and for producing a control signal dependent on said monitored characteristic;
- the tuneable monitoring means, in a continuous tuning mode of operation, for modifying the dependency between the monitored characteristic and the control signal in dependence upon one or more characteristics of errors detected by said error correction means; and
- the operating parameter control means, in said continuous tuning mode of operation, for controlling said one or more performance controlling operating parameters in dependence upon said control signal.

* * * * *